(12) United States Patent
Brown et al.

(10) Patent No.: US 11,465,781 B2
(45) Date of Patent: Oct. 11, 2022

(54) STRUCTURAL TAPE DEPLOYMENT APPARATUS

(71) Applicant: River Front Services, Inc., Chantilly, VA (US)

(72) Inventors: Donald Ray Brown, Oakton, VA (US); Anthony Miles Brown, Sneads Ferry, NC (US); Thomas Jeffrey Harvey, Nederland, CO (US); Colleen Roseanna Harvey, Nederland, CO (US); Toby Justin Harvey, Nederland, CO (US)

(73) Assignee: River Front Services, Inc., Chantilly, VA (US)

( * ) Notice: Subject to any disclaimer, the term of this patent is extended or adjusted under 35 U.S.C. 154(b) by 269 days.

(21) Appl. No.: 15/905,244

(22) Filed: Feb. 26, 2018

(65) Prior Publication Data
US 2018/0244405 A1 Aug. 30, 2018

Related U.S. Application Data

(60) Provisional application No. 62/464,319, filed on Feb. 27, 2017.

(51) Int. Cl.
| | | |
|---|---|---|
| *B64G 1/22* | (2006.01) | |
| *B65H 75/44* | (2006.01) | |
| *B65H 27/00* | (2006.01) | |
| *B64G 1/44* | (2006.01) | |
| *B65H 16/00* | (2006.01) | |

(52) U.S. Cl.
CPC ............ *B64G 1/222* (2013.01); *B65H 27/00* (2013.01); *B65H 75/4402* (2013.01);
(Continued)

(58) Field of Classification Search
CPC ............... B65H 27/00; B65H 75/4402; B65H 75/4426; B65H 75/4486; B65H 2701/172;
(Continued)

(56) References Cited

U.S. PATENT DOCUMENTS 3,499,610 A * 3/1970 Leonard ................. H01Q 1/087
242/390.2
3,589,632 A * 6/1971 Rew ...................... B21C 47/003
436/509
(Continued)

FOREIGN PATENT DOCUMENTS

| DE | 69206704 T2 | 7/1996 |
| WO | 2018157061 A1 | 8/2018 |

OTHER PUBLICATIONS

Teixeira, "International Search Report and Written Opinion of PCT/US2018/019730", dated May 11, 2018, 14 pages.
(Continued)

*Primary Examiner* — William A. Rivera
(74) *Attorney, Agent, or Firm* — Johnson, Marcou, Isaacs & Nix, LLC

(57) ABSTRACT

A tape drive comprises a roll of a tape that can be extended from a rolled state to an extended state. The tape includes a rigid material that supports the tape and a pliable material disposed at least partially on one side of the tape. A compression roller is disposed on a side of the tape and is biased toward the tape. A drive roller is disposed on the other side of the tape. The drive roller comprises an uneven surface that mechanically engages the pliable material of the tape, without protruding through the tape, as a result of the bias of the compression roller forcing the tape toward the drive roller. A motor turns the drive roller to extend the tape from the roll as the protrusions of the uneven surface of the drive roller mechanically engage the pliable material of the tape as the drive roller turns.

17 Claims, 20 Drawing Sheets

(52) U.S. Cl.
CPC ..... *B65H 75/4426* (2013.01); *B65H 75/4486* (2013.01); *B64G 1/44* (2013.01); *B65H 16/005* (2013.01); *B65H 2301/44318* (2013.01); *B65H 2404/121* (2013.01); *B65H 2701/11332* (2013.01); *B65H 2701/172* (2013.01); *B65H 2701/371* (2013.01)

(58) Field of Classification Search
CPC .... B65H 2404/121; B65H 2701/11332; B65H 2301/44318; B65H 2701/371; B65H 16/005; B64G 1/222; B64G 1/44; E04C 3/005
See application file for complete search history.

(56) References Cited

U.S. PATENT DOCUMENTS

| | | | | |
|---|---|---|---|---|
| 3,862,528 A * | 1/1975 | Meissinger | ............. | B64G 9/00 52/108 |
| 5,551,821 A * | 9/1996 | Hall | ............. | B65G 47/82 414/18 |
| 10,100,968 B1 * | 10/2018 | Chow | ............. | E04C 3/005 |
| 10,160,555 B2 * | 12/2018 | Turse | ............. | B64G 1/222 |
| 2003/0131745 A1 * | 7/2003 | Sauer | ............. | B65H 27/00 101/375 |
| 2014/0048672 A1 * | 2/2014 | Woodruff | ............. | F16M 11/40 248/404 |
| 2015/0259911 A1 * | 9/2015 | Freebury | ............. | E04C 3/005 52/108 |
| 2017/0298628 A1 * | 10/2017 | Rakow | ............. | E04C 3/005 |
| 2018/0111703 A1 * | 4/2018 | Hensley | ............. | H01Q 1/1235 |
| 2019/0383014 A1 * | 12/2019 | Turse | ............. | B64G 1/222 |

OTHER PUBLICATIONS

Wittmann-Regis, "International Preliminary Report on Patentability issued in International Application PCT/US2018/019730 filed Feb. 26, 2018", dated Aug. 27, 2019, 7 pages.

* cited by examiner

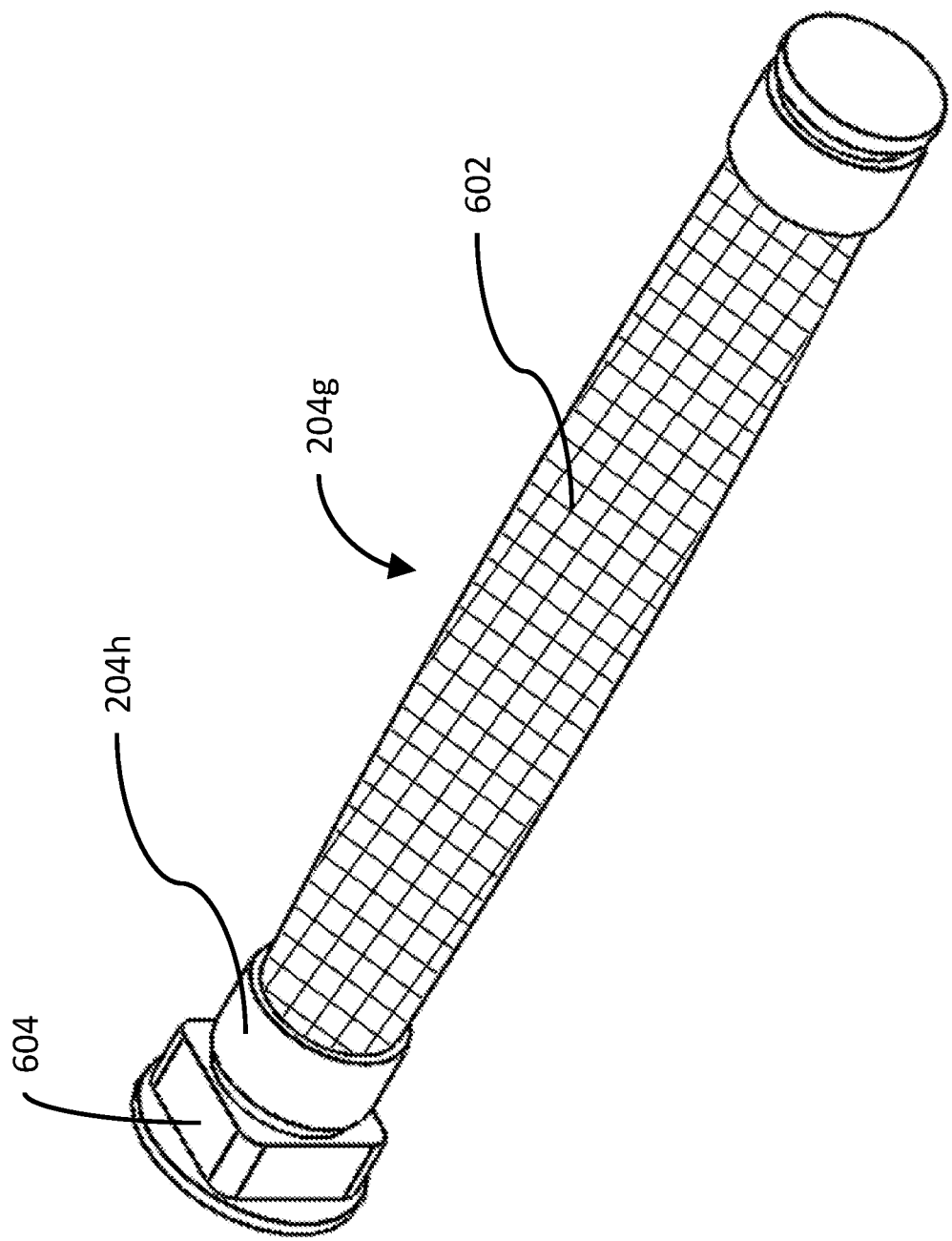

STRUCTURAL TAPE DEPLOYMENT APPARATUS

CROSS REFERENCE TO RELATED APPLICATIONS

This application claims priority to U.S. Provisional Patent Application No. 62/464,319 filed Feb. 27, 2017 and titled "Structural Tape Deployment Apparatus." The entire contents of the above-identified priority application are hereby fully incorporated herein by reference.

TECHNICAL FIELD

The invention described herein relates to a mechanical deployment device to extend and retract structural tape from a rolled state to an extended state, and more particularly, to a mechanical structural tape deployment device suitable for use in space and other environments.

BACKGROUND

Structural tape is used, for example, in space applications to extend and support solar panels, antennas, reflect arrays, and other equipment. The structural tape is transported in a rolled state to occupy a small volume of cargo space. Additionally, the solar panel or other equipment is transported in a compressed configuration to occupy a small amount of cargo space. When the spacecraft is on station and the solar panel, or other equipment, is ready for deployment, the structural tape is extended from the rolled state to push the solar panel open and to support the open solar panel, or to similarly operate with other equipment.

Conventional structural tape deployment devices for space applications include a drive roller that drives a tape from a rolled position into an extended position by pushing an end of the tape away from the roll to unwind the tape. The conventional drive roller includes a single row of dull spikes spaced evenly around the circumference of the roller. The spikes are long enough to protrude into corresponding holes spaced evenly in the center of the tape. As the drive roller turns, the roller spikes engage the holes in the tape to push the tape to the extended state or to retract the tape to the rolled state.

This conventional design requires hundreds of holes to be drilled in the length of the tape, as the holes are spaced, for example, one-quarter to one-half inch apart. The holes compromise the strength of the tape, particularly in the extended position. To compensate for the compromised strength, the tape must be thicker to avoid breaking or cracking. A thicker tape winds into a bigger roll, which occupies a larger volume of cargo space. A thicker tape also has an increased weight. Increased weight and volume are costly for space travel.

The conventional drive roller has a diameter based on the spacing of the holes in the tape to allow the spikes to engage each hole in the tape. Thus, the conventional drive roller has a relatively larger diameter, which requires a more powerful, and physically larger, motor to drive the winding and unwinding of the tape. The larger tape and motor result in a larger and heavier tape deployment apparatus. Such bigger and heavier components and apparatus require a large volume and weight of valuable cargo area for spaceflight, resulting in higher cargo costs. Manufacturing costs also are high for such conventional tape deployment devices because of the additional machining required to drill hundreds of holes in the tape.

Another type of conventional tape deployment device includes a compression drive. The tape is pressed between two rollers, and the compression provides sufficient frictional force to wind and unwind the tape as the drive roller is turned. While this design does not include the spikes on the drive roller and the corresponding holes in the tape, this design that relies on frictional force is less suitable for applications in space because of the unpredictability of the material's coefficient of friction in the space environment. For example, a device relying on friction alone requires additional high-force springs and more powerful motors, and this conventional design is still less analytically predictable. All of these requirements increase the weight and volume of the system, thereby making the frictional drive an unreasonable solution in an environment in which cargo space (volume and weight), power, and mass are limited and/or expensive.

Conventional tape deployment devices also do not include a mechanical limit switch to secure the tape in an extended position (or a rolled or intermediate position) or to report full deployment of the tape. Conventional tape deployment devices rely on stopping rotation of the drive roller to hold the tape in a desired position.

SUMMARY

A structural tape deployment apparatus comprises a roll of a structural tape that can be wound and unwound between a rolled state and an extended state. The tape is of the nature that the tape is stable in the rolled state and does not require any structural support to prevent the tape from unfurling. Likewise, when the tape is in the extended position, the tape is stable and does not require any supporting devices. To create an environment in which friction can be developed without the addition of mechanical systems, power, and volume, the tape can be doped with a pliable material or elastomer disposed fully or at least partially on one side or both sides of the tape. A compression roller is disposed on one side of the tape and is biased toward the tape. A drive roller is disposed on the other side of the tape. The drive roller comprises an uneven surface. The uneven surface of the drive roller mechanically engages the pliable material of the tape, without protruding through the tape, as a result of the bias of the compression roller forcing the tape toward the drive roller. Likewise, the pliable material or elastomer may be applied to the drive roller and the roughened surface may be on the tape. A motor is coupled to the drive roller to turn the drive roller. Turning the drive roller forces the tape to wind and unwind the roll of tape as protrusions of the uneven surface of the drive roller or tape mechanically engage the pliable material of the tape or drive roller, respectively, as the drive roller is turned, without extending through the tape.

These and other aspects, objects, features, and advantages of the invention will become apparent to those having ordinary skill in the art upon consideration of the following detailed description of illustrated examples.

BRIEF DESCRIPTION OF THE DRAWINGS

FIG. 1, comprising

FIG. 6 is a perspective view of a drive roller of the structural tape deployment apparatus, in accordance with certain examples.

DETAILED DESCRIPTION

Turning now to the drawings, in which like numerals represent like (but not necessarily identical) elements throughout the figures, examples are described in detail.

Figure 1A:
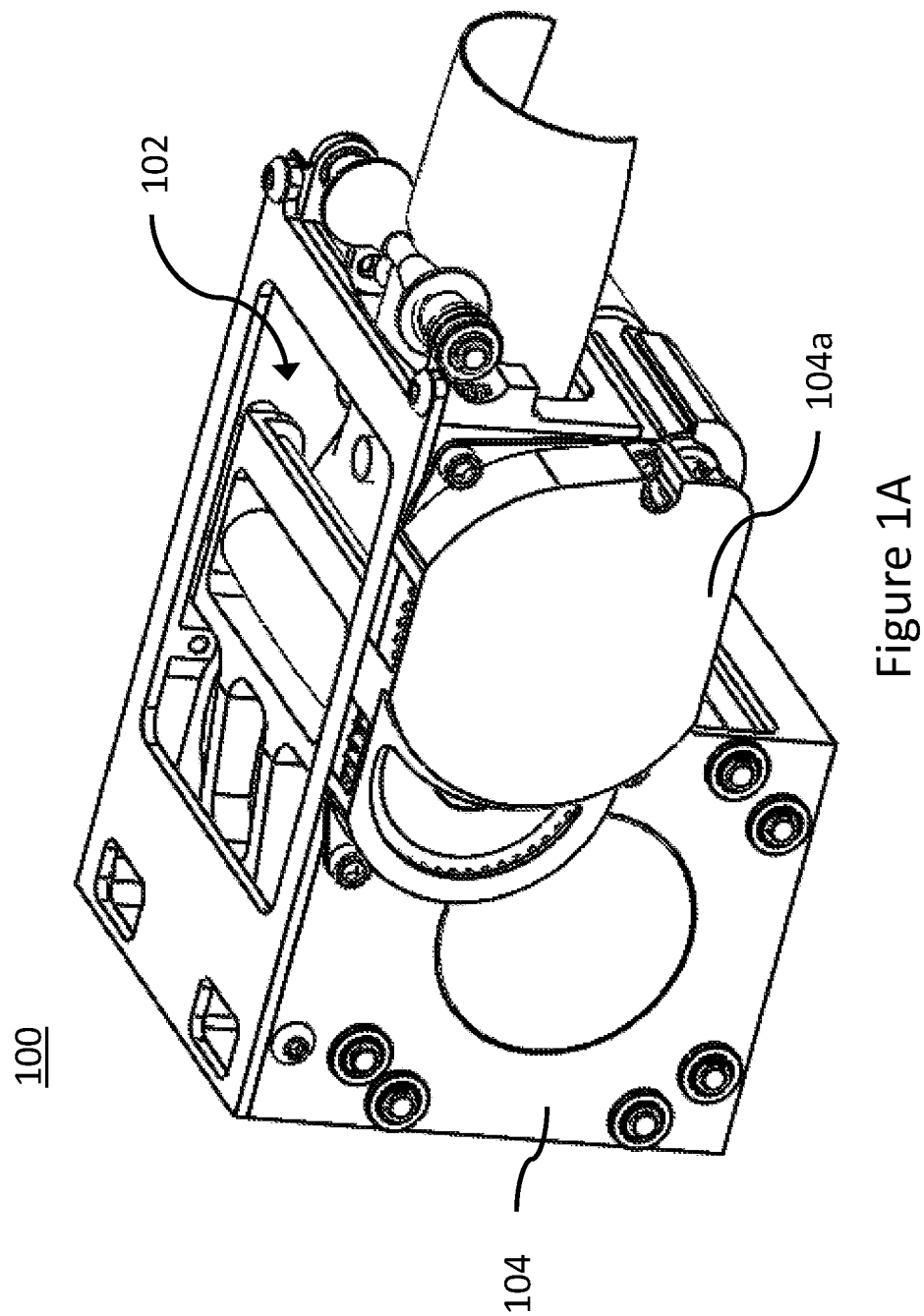
FIGS. 1A and 1B, depicts a structural tape deployment apparatus, in accordance with certain examples.
Figure 1B:
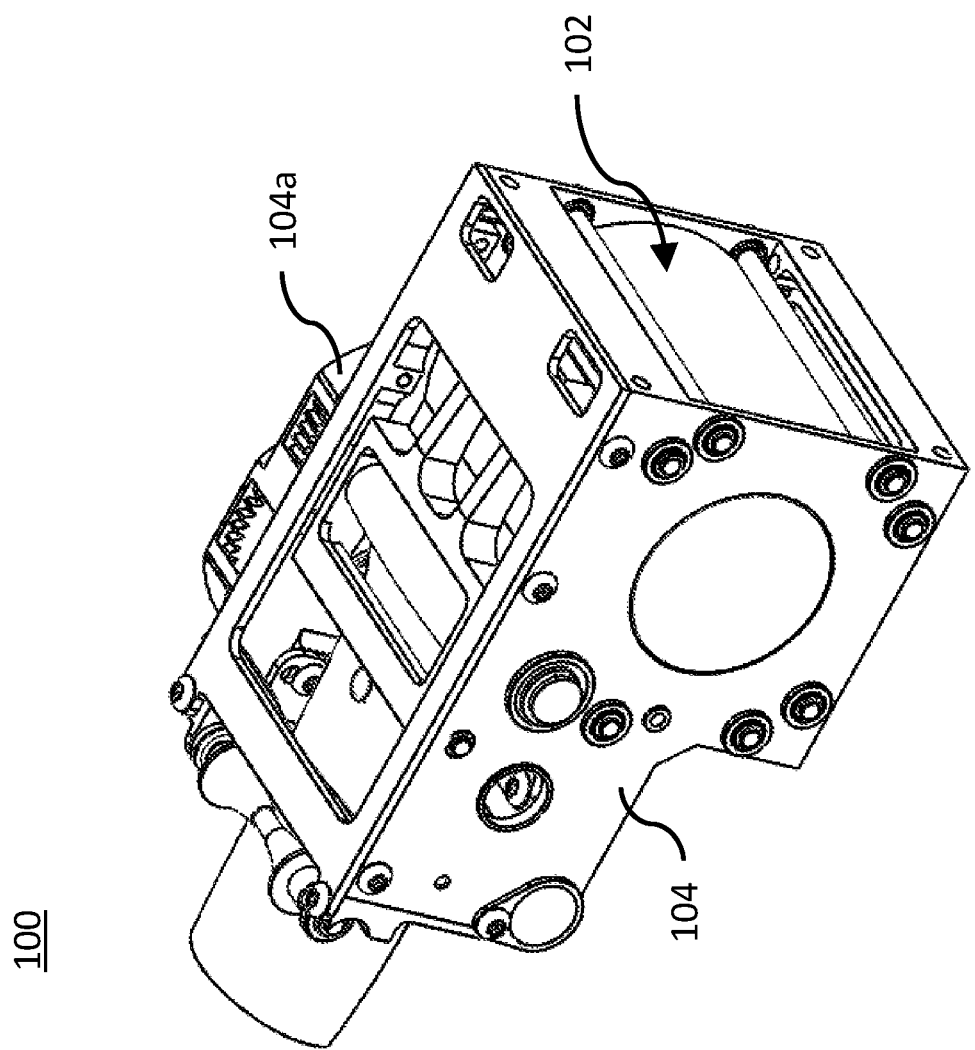

FIG. 1A is a front perspective view of a structural tape deployment apparatus 100, in accordance with certain examples. FIG. 1B is rear perspective view of the structural tape deployment apparatus 100, in accordance with certain examples. Structural tape deployment apparatus 100 includes a tape drive mechanism 102 disposed within a housing 104. The housing 104 includes a motor housing 104a enclosing various gears of the tape drive mechanism 102 that extend outside the housing 104. The tape drive mechanism 102 will be described in further detail hereinafter with reference to FIGS. 2-7.

Figure 2:
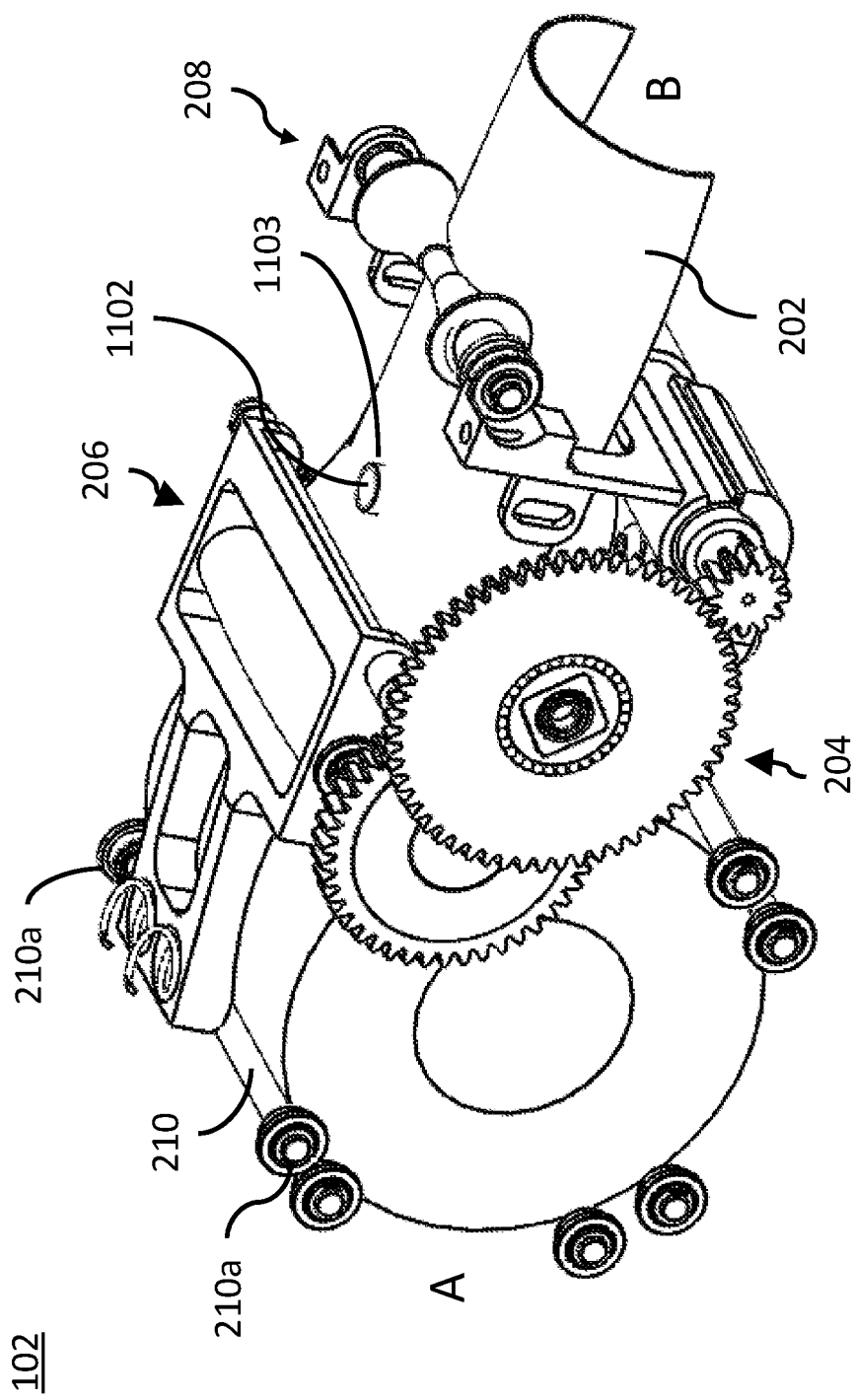
FIG. 2 is a front perspective view of a tape drive mechanism of the structural tape deployment apparatus, in accordance with certain examples.

FIG. 2 is a front perspective view of the tape drive mechanism 102 of the structural tape deployment apparatus 100, in accordance with certain examples. The tape drive mechanism 102 comprises a structural tape 202 driven from a rolled position A to an extended position B by operation of a drive roller assembly 204 and a compression roller assembly 206. Structural tape 202 may be referred to herein as either structural tape 202 or tape 202. The drive roller assembly 204 mechanically engages a surface of the tape 202, while the compression roller assembly 206 forces the tape 202 into contact with the drive roller assembly 204, to drive the tape 202 from the rolled position A through a tape guide assembly 208 to the extended position B. The tape guide assembly 208 supports the tape 202 in the transition from the flat, rolled state to the extended, curved state. The drive roller assembly 204 and compression roller assembly 206 will be described in more detail hereinafter with reference to FIG. 3. The tape guide assembly 208 will be described in more detail hereinafter with reference to FIGS. 12A-12B and 13A-13C.

In the rolled position A, the tape 202 is flat and wound in a cylindrical shape. In the extended position B, the tape 202 is extended in a direction away from the drive roller assembly 204 and the compression roller assembly 206 with regard to the position of the rolled tape 202. In the extended position B, the tape 202 may have a curved shape that provides rigidity for the extended tape 202 as it extends from the tape drive mechanism 102.

The tape 202 may be a composite tape comprised of graphite, fiberglass, or other suitable materials or combinations thereof. The composition of the tape 202 is chosen to achieve a desired strength and stability of the tape 202 based on a specified application for the tape 202. The tape 202 can be stable in both the rolled position A and the extended position B. In the rolled position A, the tape 202 is stable such that it does not have interior forces inducing the tape 202 to expand. In the extended position B, the tape is straight and rigid, which may provide an extension force and/or a structural force for a component coupled to the structural tape deployment apparatus 100. The tape 202 may comprise any suitable material that allows winding the tape 202 into the rolled position A and extending the tape 202 into the extended position B to provide a suitable strength and stability of the extended tape 202 for its application.

In the extended position B, the tape 202 comprises a curved profile. As shown in FIG. 2, the curved profile is 270 degrees of a circle. However, the tape 202 may comprise any suitable profile that achieves the desired strength and stability of the extended tape 202 for its application. For example, the profile may be 90 degrees or 180 degrees of a circle, or any suitable profile in a range of 45 degrees to 360 degrees or more.

Idle rollers 210 support the rolling and unrolling of the tape 202 as the tape 202 extends from the rolled position A to the extended position B. The idle rollers 210 comprise idle roller bearings 210a on each end thereof. The idle rollers 210 are free to turn as the tape 202 passes in contact with a surface of the idle rollers 210. The idle roller bearings 210a are secured in the housing 104 (see FIG. 1). Seven idle rollers 210 are depicted in FIG. 2. However, any suitable number of idle rollers 210 may be used to provide the desired support and guidance for the tape 202.

A stop 1102 of a limit switch 1100 (See FIGS. 11A-11B) protrudes through an aperture 1103 in the tape 202 when the tape 202 is fully extended (or otherwise extended to a desired length) to prevent retraction or extension of the tape 202 while deployed. The limit switch 1100 will be described in further detail hereinafter with reference to FIGS. 11A-11B.

Figure 3:
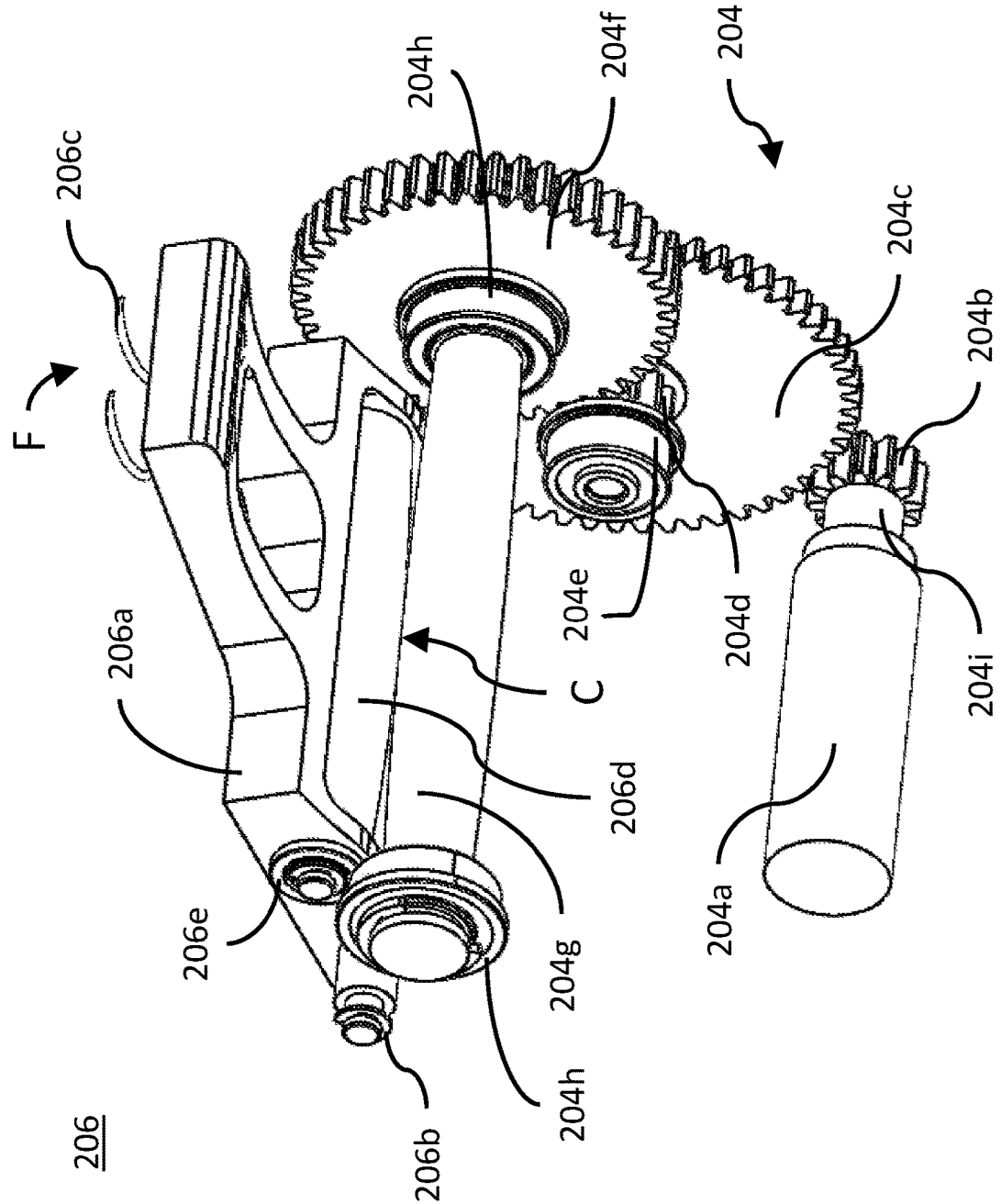
FIG. 3 is a rear perspective view of a drive roller assembly and a compression roller assembly of the tape drive mechanism, in accordance with certain examples.

FIG. 3 is a rear perspective view depicting a drive roller assembly 204 and a compression roller assembly 206 of the structural tape deployment apparatus 100, in accordance with certain examples.

In the drive roller assembly 204, a motor 204a is coupled to a spur gear 204b and drives the spur gear 204b in a clockwise or counterclockwise direction, depending on the desired extension or retraction of the tape 202. The motor 204a can be secured to the housing 104 (FIG. 1) by a collar 204i.

The motor 204a drives the spur gear 204b, which drives a bull gear 204c having a pinion gear 204d attached thereto. The pinion gear 204d drives a drive gear 204f, which drives a drive roller 204g.

The bull gear 204c includes bull gear bearings 204e, which can be secured to the housing 104 (FIG. 1) and in which the pinion gear 204d turns.

The drive roller 204g turns inside drive roller bearings 204h based on turning of the drive gear 204f coupled to an end of the drive roller 204g. The drive roller bearings 204h can be secured to the housing 104 (FIG. 1).

In the compression roller assembly 206, a frame 206a is coupled on one end to the housing 104 (FIG. 1) by a frame anchor 206b on each side of the frame 206a. The frame anchor 206b can be a pin that passes through the housing 104 (FIG. 1) and the frame 206a and that is secured to the housing 104 (FIG. 1) on both ends outside the frame 206a. The frame 206a can pivot around the frame anchor 206b with respect to the housing 104 (FIG. 1).

Figure 4:
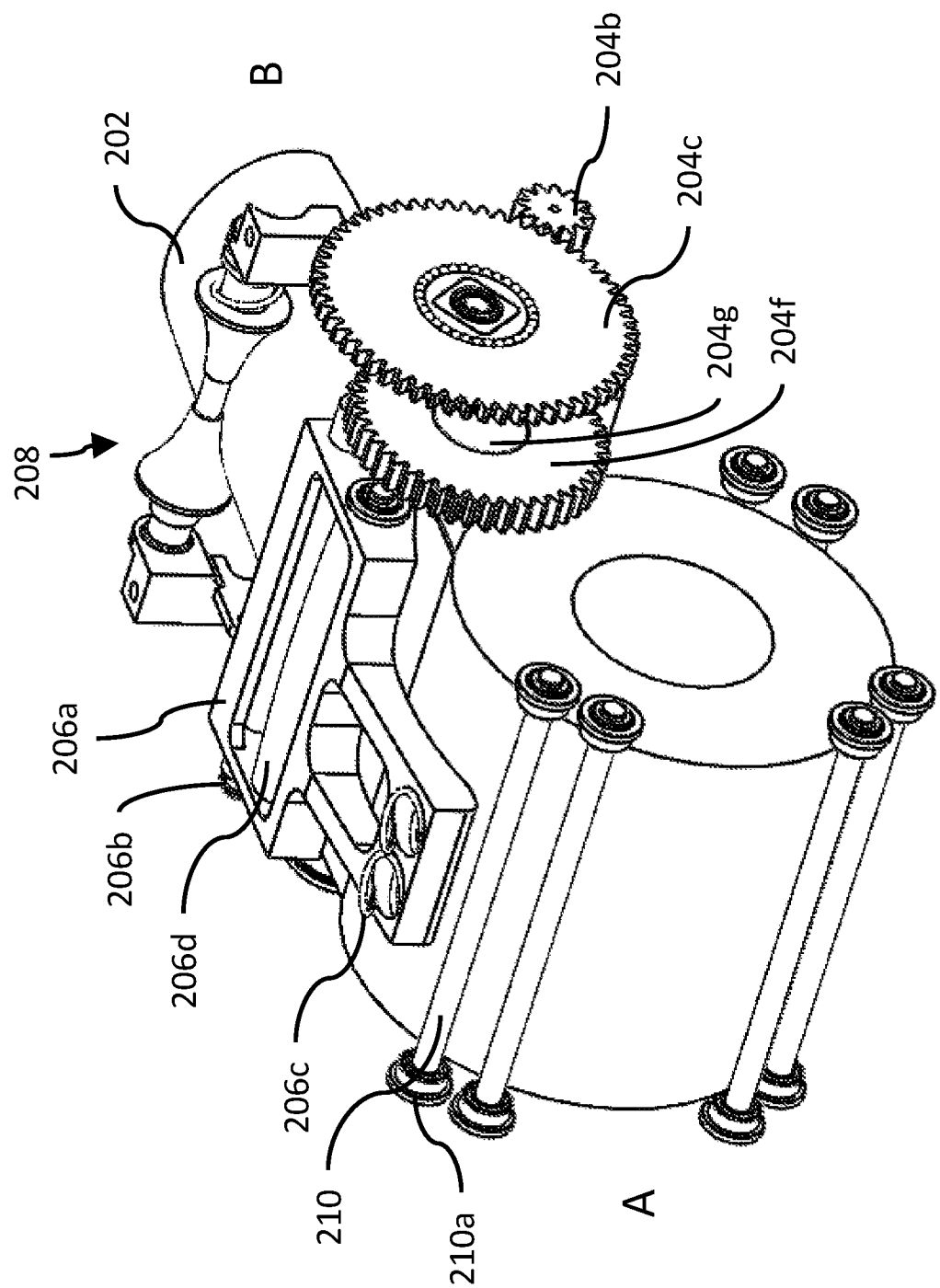
FIG. 4 is a rear perspective view of the tape drive mechanism depicted in FIG. 2.

The frame 206a is biased by two springs 206c on an end of the frame 206a that is opposite the frame anchor 206b (see FIG. 4 for a more detailed illustration of the springs 206c). The two springs 206c are compressed between the frame 206a and the housing 104 (FIG. 1) to provide a force F on the frame 206a and in the direction illustrated in FIG. 3 toward the drive roller 204g of the drive roller assembly 204. A compression roller 206d turns inside compression roller bearings 206e attached to the frame 206a.

The force F on the frame 206a biases the compression roller 206d toward the drive roller 204g at position C, as the frame 206a rotates around the frame anchor 206b. The tape 202 (not depicted in FIG. 3) passes through position C, where the compression roller 206d forces the tape 202 toward the drive roller 204g such that the drive roller 204g mechanically engages a surface of the tape 202 to extend or retract the tape 202.

An amount of power the drive motor 204a is capable of producing is selected based on the power desired to drive a particular tape 202. A smaller drive motor 204a may be sufficient to drive a relatively smaller and/or lighter tape 202, while a larger drive motor 204a may be needed to drive a relatively larger and/or heavier tape 202. While a more powerful motor than needed may be used, selecting the appropriate motor size may allow a decrease in weight for the structural tape deployment apparatus 100.

FIG. 4 is a rear perspective view of the tape drive mechanism 102 depicted in FIG. 2. FIG. 4 is labeled in greater detail to show many of the individual components described in FIG. 3.

Figure 5A:
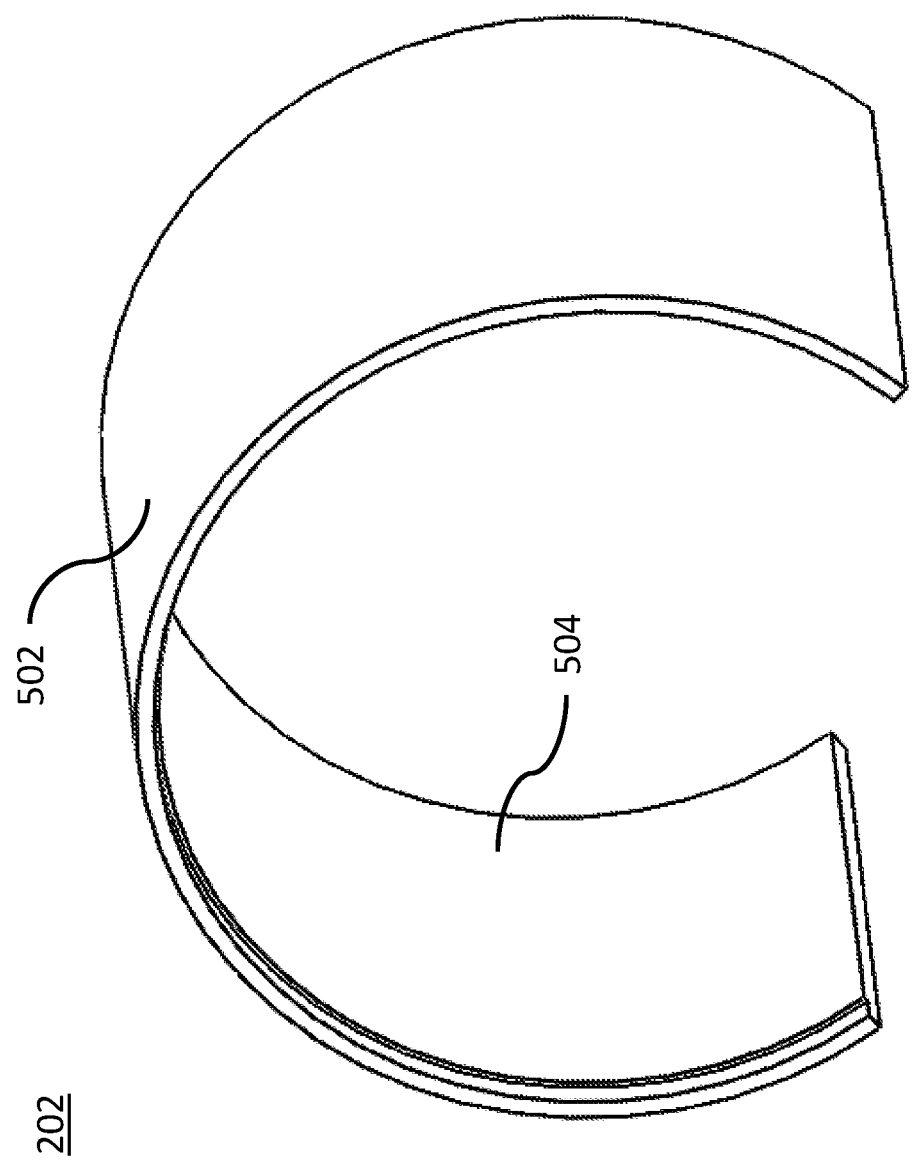
FIGS. 5A and 5B are perspective and cross-sectional views, respectively, of a structural tape of the structural tape deployment apparatus, in accordance with certain examples.
Figure 5B:
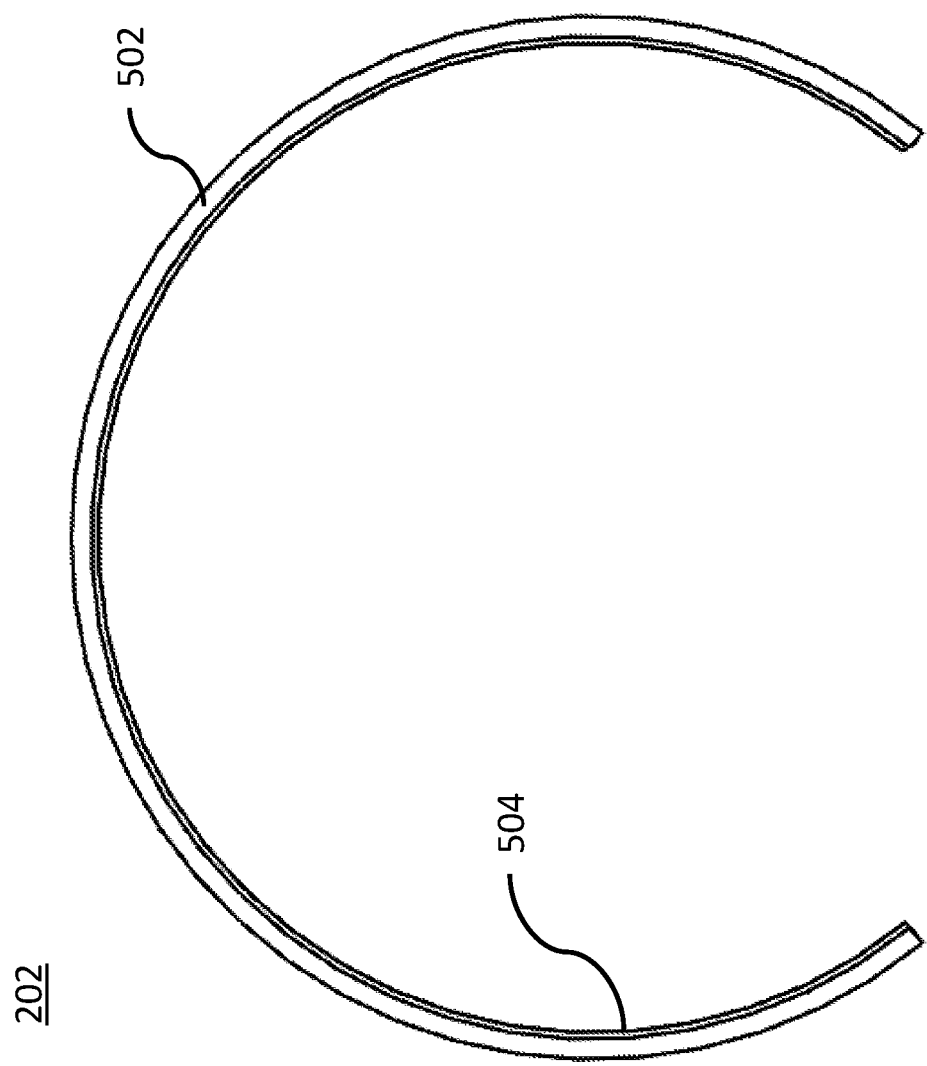

FIG. 5A is a perspective view of an extended section of the tape 202, in accordance with certain examples. The tape 202 includes two layers, a rigid layer 502 and a pliable layer 504 coupled to the rigid layer 502. FIG. 5B is a magnified view of a section of the tape 202 illustrated in FIG. 5A.

The rigid layer 502 of the tape 202 provides a desired rigidity and strength for the tape 202 to perform its desired functions. For example, if the tape 202 is used to extend and support a solar panel, antenna, reflect array, or other equipment in a space environment, the composition of the rigid layer 502 of the tape 202 can be selected to provide sufficient rigidness to extend and retract the panel or other equipment and sufficient rigidity to support the extended panel or other equipment.

The pliable layer 504 of the tape 202 is mechanically engaged by a surface of the drive roller 204g to drive the tape 202 between the retracted and extended positions A, B. A composition of the pliable layer 504 of the tape 202 can be selected to provide a desired mechanical engagement with the drive roller 204g without yielding during the driving operation.

A durometer of the pliable layer 504 can be chosen to provide the desired characteristics. Durometer is one of several measures of hardness of a material. Hardness may be defined as a material's resistance to permanent indentation. For example, the pliable layer 504 can have a Shore A rating of about 50. A Shore A rating of between 25-75 can be used depending on factors such as the surface characteristics of the drive roller 204g, the force F provided by the compression roller 206d forcing the tape 202 onto the surface of the drive roller 204g, and a drive force provided by the drive roller 204g to extend and retract the tape 202. Any suitable durometer of the pliable layer 504 may be chosen.

For example, a lower rating may be suitable for a softer pliable layer 504 to engage a relatively less uneven surface of the drive roller 204g, in conjunction with a relatively smaller force F provided by the compression roller 206d, and/or with a relatively smaller drive force of the drive roller 204g. Alternatively, a higher rating may be suitable for a harder (yet still pliable) pliable layer 504 to engage a relatively more uneven surface of the drive roller 204g, in conjunction with a relatively higher force F provided by the compression roller 206d, and/or with a relatively higher drive force of the drive roller 204g. The pliable layer 504 is strong enough to be engaged by the surface of the drive roller 204g without being damaged by that engagement. The actual durometer of the pliable layer 504 can be chosen for specific applications of the structural tape deployment apparatus 100 to provide a desired mechanical drive force to the tape 202. The material, or combination of materials, for the pliable layer can be selected based on the desired durometer of the pliable layer. The pliable layer 504 can be a soft, rubbery material, such as an elastomer. Harder pliable layer materials may be used and generally exhibit higher shear strengths allowing higher loads on the tapes.

The pliable layer 504 can be applied to the rigid layer 502 of the tape 202 by any suitable method. For example, the material forming the pliable layer 504 can be applied to the surface of the rigid layer 502 of the tape 202 in a liquid form and cured to its final state. The material can be painted or sprayed onto the surface of the rigid layer 502 of the tape 202 and then cured. The rigid layer 502 of the tape 202 can be dipped in the material, which is then cured to form the pliable layer 504. A sheet of the material forming the pliable layer 504 can be adhered to the surface of the rigid layer 502 via a suitable bonding agent.

Although not illustrated in FIGS. 5A and 5B, the tape 202 may include a pliable layer 504 on both sides of the rigid layer 502 of the tape 202. In this case, each pliable layer 504 may be applied to the sides of the rigid layer 502 as discussed previously. Dipping the rigid layer 502 in the material that is cured to form the pliable layer 504 may result in simultaneous application of the pliable layer 504 to both sides of the rigid layer 502.

The pliable layer 504 allows the surface of the drive roller 204g to mechanically engage the surface of the tape 202 to drive the tape 202 from the rolled position A to the extended position B and from the extended position B to the rolled position A (see FIG. 2), as discussed in more detail hereinafter. The mechanical engagement of the pliable layer 504 to the surface of 204g enables an accurate stress and loads analysis to be performed that does not rely on friction. This analysis is important for space flight applications because relying on friction for space operations is generally not allowed by the community.

The pliable layer 504 on the tape 202 can be a continuous layer having a constant thickness across the surface of the tape 202. However, other suitable configurations of the pliable layer 504 on the surface of the tape 202 are suitable. For example, because the pliable layer 504 may be applied to the rigid layer 502 of the tape 202 while the tape 202 is in the extended position B (FIG. 2), the pliable layer 504 may pool either in the middle of the tape 202 or at the edges of the tape 202 before curing. The pooling may be caused by the curved shape of the tape 202 in the extended position B (FIG. 2), whereby the material applied to the tape 202 flows to the center of the tape 202 or to the edges of the tape 202 depending on the horizontal orientation of the tape 202 during the curing process. Orienting the tape 202 in a vertical position during the curing process may reduce pooling of the pliable layer 504 during the curing process, which may result in a more uniform application of the pliable layer 504 to the rigid layer 502 of the tape 202.

The pliable layer 504 may also be applied intermittently on the surface of the rigid layer 502 of the tape 202. For example, the pliable layer 504 may be applied in stripes, cross hatches, or other suitable pattern on the rigid layer 502 of the tape 202. The stripes may be parallel or orthogonal to the edges of the tape 202, or angled with respect to the edges of the tape 202. The pattern of the pliable layer 504 on the rigid layer 502 covers enough of the surface area of the rigid layer 502 of the tape 202 to allow the surface of the drive roller 204g to mechanically engage the pliable layer 504 of the tape 202 to drive the tape 202 between the rolled position A and the extended position B (FIG. 2). The intermittent coverage of the pliable layer 504 on the surface of the rigid layer 502 of the tape 202 can reduce the amount of material used for the pliable layer 504 while still allowing the drive roller 204g to provide sufficient drive force to the tape 202. The reduced amount of the pliable layer 504 may result in decreased weight and manufacturing cost.

A thickness of the pliable layer 504 may equal at least a thickness of indentations in, or protrusions from, an uneven surface of the drive roller 204g. Accordingly, the uneven surface of the drive roller 204g may fully mechanically engage the pliable layer 504 of the tape 202. The uneven surface of the drive roller 204g will be described in more detail hereinafter with reference to FIG. 6. Additionally, fibers or granular materials can be mixed into the pliable layer before or after it is applied to create additional mechanical engagement of the pliable layer 504 with the surface of the drive roller 204g. Fibers may also improve the shear strength of the pliable layer 504. The pliable layer 504's thickness, strength, and durometer determine how large of a footprint or engagement spot is developed where the drive roller 204g bears on the pliable layer 504. The foot print area and the shear strength of the pliable layer 504 combine to determine a maximum force to deploy the tape 202. This combination of loads and material strengths combine to determine the desired thickness of the pliable layer 504.

FIG. 6 is a perspective view of a drive roller 204g of the tape drive assembly 204 of the structural tape deployment apparatus 100, in accordance with certain examples. The drive roller 204g includes the drive roller bearings 204h on each end. The drive roller bearings 204h can be coupled to the housing 104 (FIG. 1) by housing anchors 604 (only one housing anchor 604 is depicted in FIG. 6 for ease of illustration).

As shown in FIG. 6, the drive roller 204g has an uneven surface 602 to mechanically engage a surface of the tape 202 (not shown in FIG. 6).

The uneven surface 602 can have any suitable configuration such that the force F (FIG. 3) provided by the compression roller 206d onto the tape 202 causes the uneven surface 602 of the drive roller 204g to mechanically engage with the pliable layer 504 of the tape 202.

The uneven surface 602 of the drive roller 204g can be formed in any suitable manner. For example, a knurled surface pattern can be machine pressed into the surface of the drive roller 204g. Different sizes and shapes of the knurling pattern will result in different sizes and depths of the uneven surface 602 of the drive roller 204g. The surface of the drive roller 204g can be sandblasted to create the uneven surface 602. Different sizes, types, and duration of application of the particulate material used in the sandblasting process will result in different sizes and depths of the uneven surface 602 of the drive roller 204g. A sheet of "sandpaper" having a desired unevenness of the surface can be adhered to a surface of the drive roller 204g to provide the uneven surface 602. For example, 180 grit sand paper has been tested with desirable results, though other tested grits also work suitably well. Sand, aluminum oxide, or other particulate can be bonded to the surface of the drive roller 204g to provide the uneven surface 602. Different sizes, types, and surface area coverage of the bonded particulate will result in different sizes and depths of the uneven surface 602 of the drive roller 204g. The uneven surface 602 of the drive roller 204g has sufficient depth from a top of the uneven surface to a bottom of the uneven surface to mechanically engage the pliable layer 504 of the tape 202 when the compression roller 206d pushes the tape 202 onto the drive roller 204g.

The uneven surface 602 of the drive roller 204g can be a knurled surface, as shown in depicted in FIG. 6. The knurled surface illustrated in FIG. 6 has a diamond pattern. However, any suitable pattern, such as ridges, crisscross pattern, or other pattern, can be used.

Surface RMS of the pliable layer 504 may vary based on several variables, such as the durometer of the pliable layer 504, the thickness of the pliable layer 504, the load on the drive roller 204g, The diameter of 204g and 206d, and the barrel radius of drive roller 204g and compression roller 206d. Given the variability of design parameters available, a surface RMS of 30 may provide a wide range of benefits for the variability in these parameters.

The drive roller 204g can have a generally cylindrical shape along its longitudinal axis. The drive roller 204g also may have a slightly convex (Barrel) shape, which may assist in keeping the tape 202 naturally centered while driving the tape 202 between the rolled position A and the extended position B (FIG. 2). The longitudinal shape of the drive roller 204g also may be contoured to correspond with a cross section of the pliable layer 504 of the tape 202. If the pliable layer 504 of the tape 202 is thicker at the edges or in the middle, as discussed previously, the drive roller 204g may have a corresponding profile that is thinner at the edges or the center, respectively. In this manner, the longitudinal shape of the drive roller 204g can apply a consistent drive force across the surface of the pliable layer 504 of the tape 202.

The structural tape deployment apparatus 100 described herein does not rely on friction to drive the tape 202. The apparatus uses the compression of the uneven surface 602 of the drive roller 204g into the pliable layer 504 of the surface of the tape 202 to mechanically engage the tape 202 as the drive roller 204g turns, as described in further detail hereinafter with reference to FIGS. 7 and 8.

Figure 7:
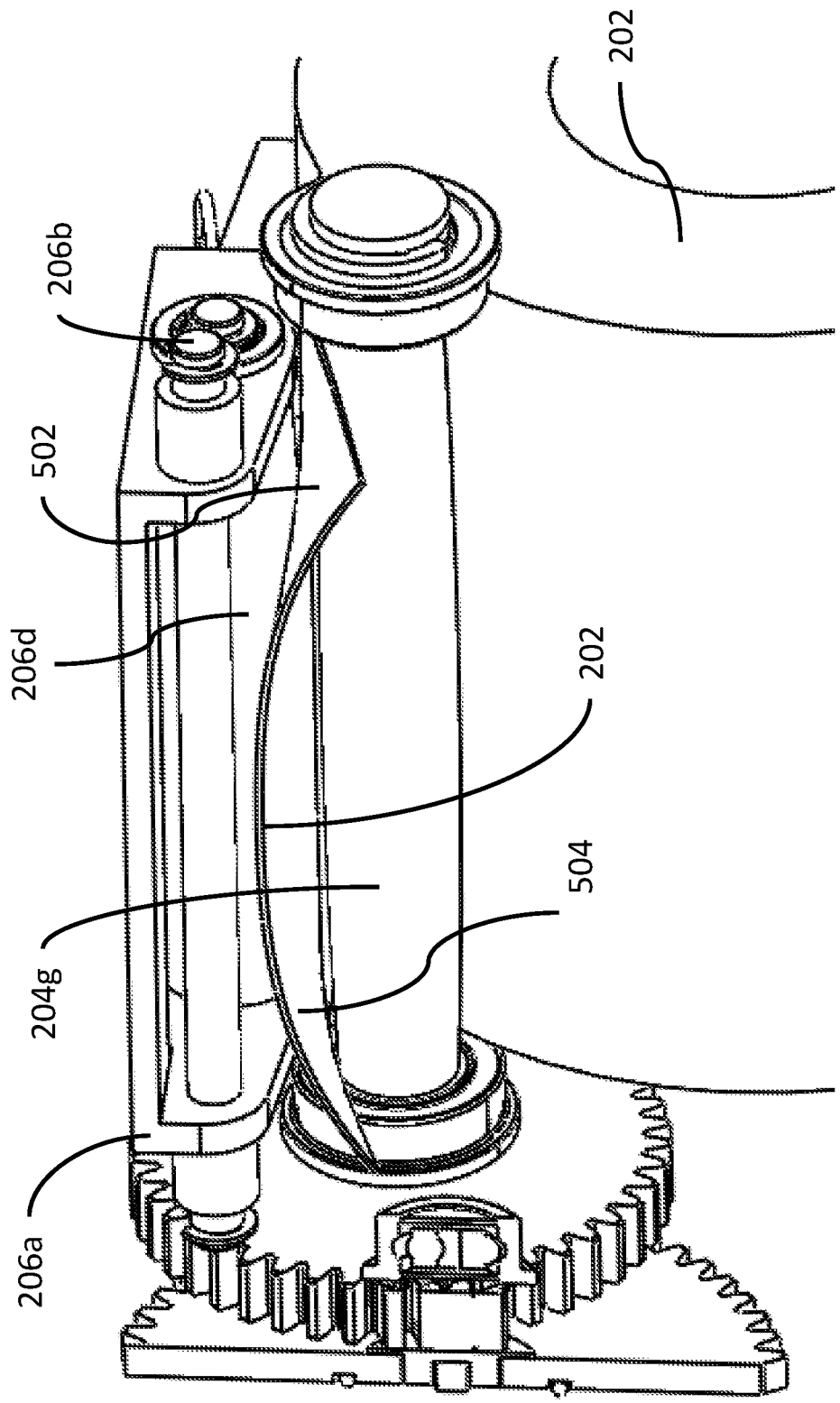
FIG. 7 depicts a tape drive assembly mechanically driving the structural tape of the structural tape deployment apparatus, in accordance with certain examples.

FIG. 7 illustrates the tape drive mechanism 102 mechanically driving the tape 202. The frame 206a of the compression roller assembly 206 pivots about the frame anchor 206b due to the force of the springs 206c (not illustrated in FIG. 7). The force F (FIG. 3) of the springs 206c pushes the compression roller 206d toward the drive roller 204g. The tape 202 is disposed between the compression roller 206d and the fixed position of the drive roller 204g. Accordingly, as the force of the springs 206c pushes the compression roller 206d toward the drive roller 204g, the compression roller 206d forces the tape 202 toward the drive roller 204g. The force causes the uneven surface 602 of the drive roller 204g to compress into the pliable layer 504 of the tape 202 to mechanically engage with the pliable layer 504 of the tape 202. As the drive motor 204a (not depicted in FIG. 7) drives the drive roller 204g, the mechanical engagement of the uneven surface 602 (FIG. 6) of the drive roller 204g with the pliable layer 504 of the tape 202 drives the tape 202 between the rolled and extended positions A, B (FIG. 2), depending on the turning direction of the drive roller 204g.

Figure 8:
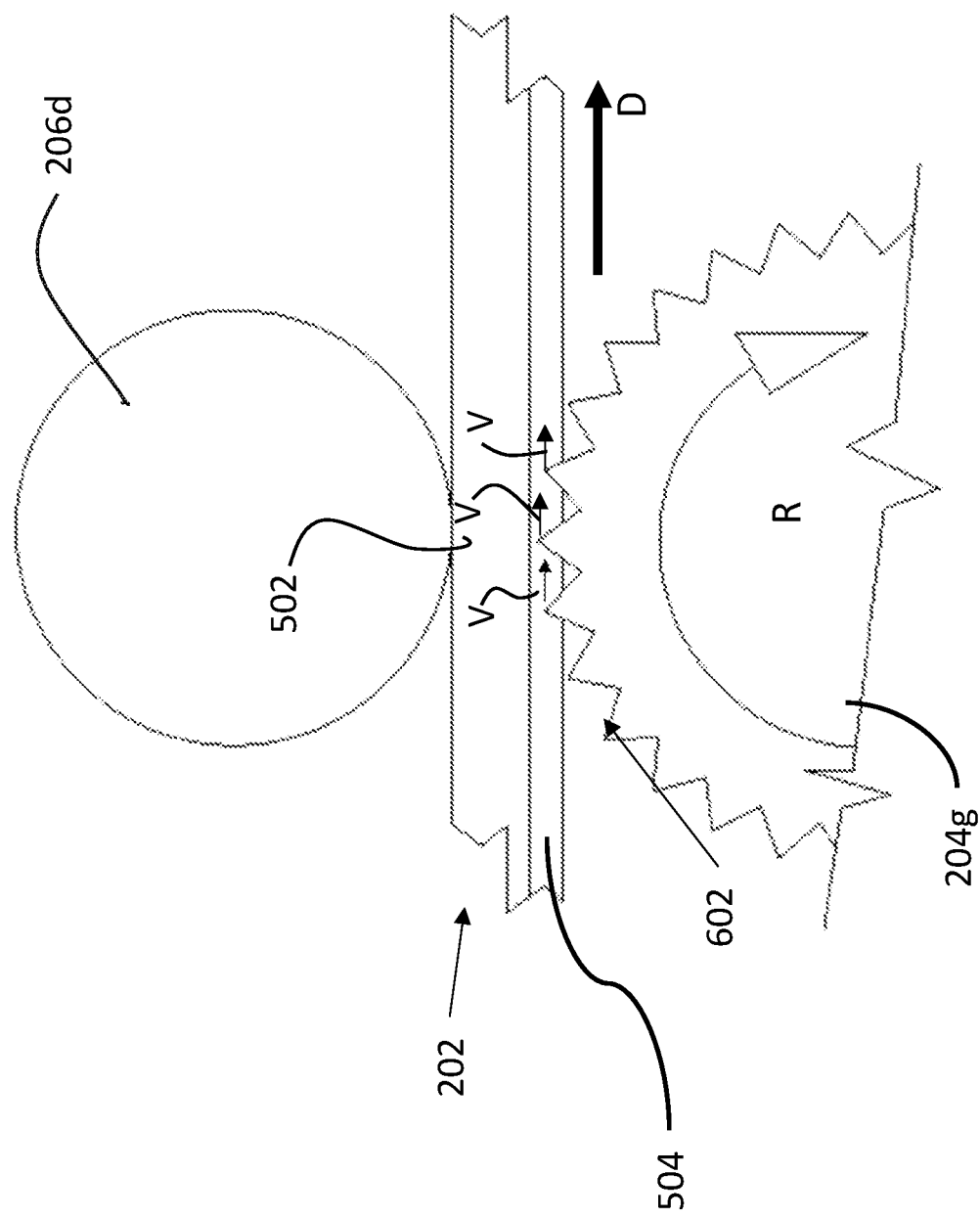
FIG. 8 is a cross-sectional view depicting a surface of a drive roller of the structural tape deployment apparatus mechanically engaging a pliable surface of the structural tape, in accordance with certain examples.

FIG. 8 is a cross-sectional view depicting the uneven surface 602 of the drive roller 204g of the structural tape deployment apparatus 100 mechanically engaging the pliable layer 504 of the tape 202, in accordance with certain examples. As illustrated, at least a portion of the uneven surface 602 of the drive roller 204g compresses the pliable layer 504 of the tape 202. As the drive roller rotates in direction R, vector forces V are created by the mechanical engagement of the embedding of the uneven surface 602 of the drive roller 204g into the pliable layer 504 of the tape 202. The vector forces V push the tape 202 in the direction D based on the rotation R illustrated in FIG. 8.

Figure 9:
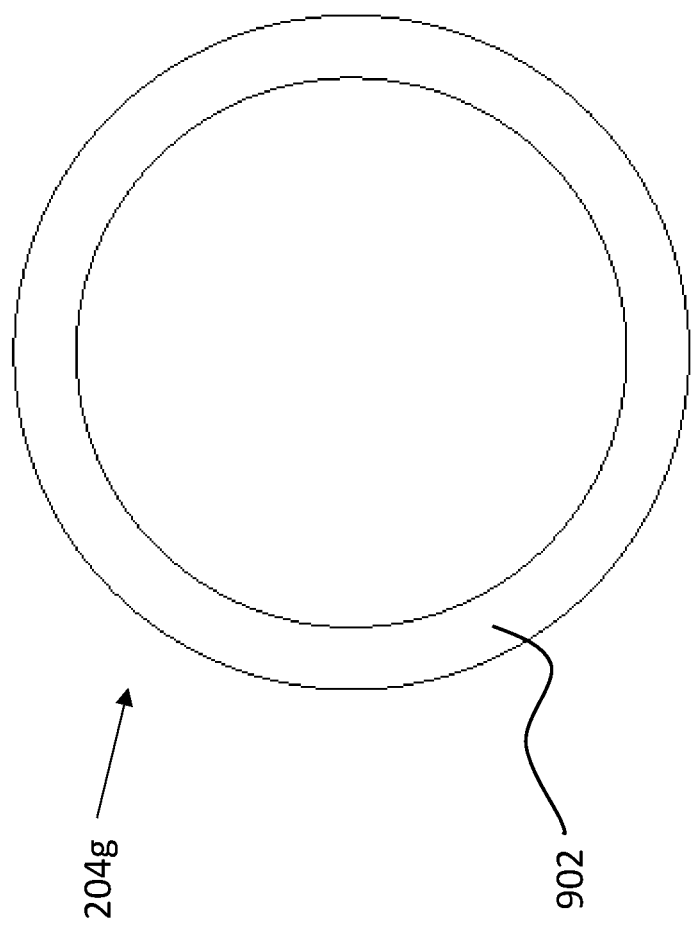
FIG. 9 is a cross-sectional view of a drive roller of a structural tape deployment apparatus, in accordance with alternative examples.
Figure 10:
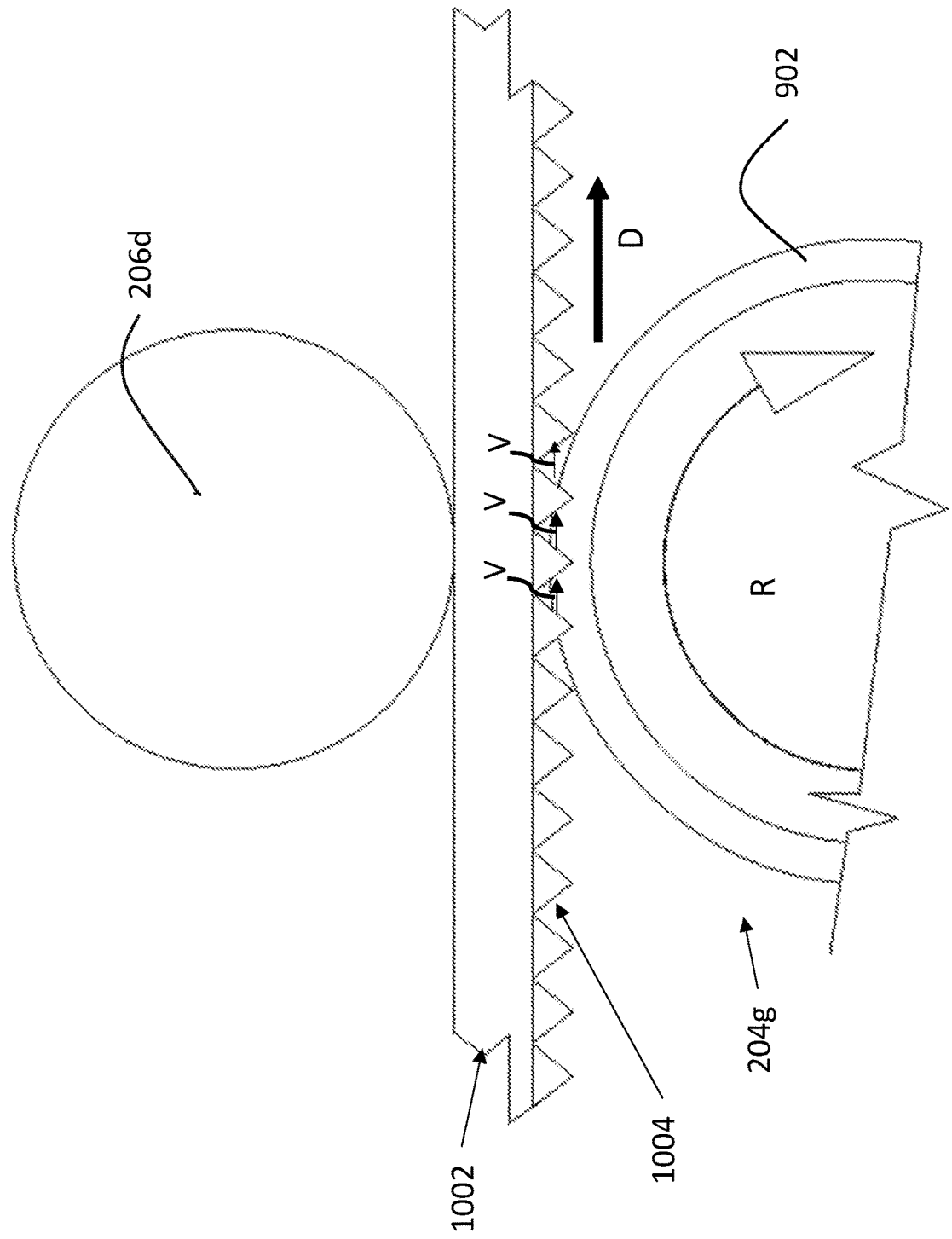
FIG. 10 is a cross-sectional view depicting a surface of a structural tape of the structural tape deployment apparatus mechanically engaging a pliable surface of a drive roller, in accordance with certain alternative examples.

An alternative design in which the pliable layer is provided on the drive roller and the uneven surface is provided on the structural tape will now be described with reference to FIGS. 9 and 10. FIG. 9 is a cross-sectional view of a drive roller 204g of a structural tape deployment apparatus 100, in accordance with alternative examples. As depicted in FIG. 9, the drive roller 204g comprises a pliable layer 902 on an outer surface of the drive roller 204g. FIG. 10 is a cross-sectional view depicting an uneven surface 1004 of a structural tape 1002 of the structural tape deployment apparatus 100 mechanically engaging the pliable surface 902 of the drive roller 204g, in accordance with certain alternative examples. In this example, the tape 1002 comprises as least the rigid layer 502 as described previously herein with reference to the tape 202, and the rigid layer of the tape 1002 may comprise the uneven surface 1004. The rigid layer of the structural tape 1002 may have the characteristics of the structural tape 202 as described herein.

In the structural tape deployment apparatus 100 described with reference to FIGS. 9 and 10, the pliable material as described herein may be applied to an outer surface of the drive roller 204g, and the uneven surface as described herein may be included on a surface of the tape 1002. In this case, the drive roller 204g may or may not have an uneven surface as described herein, and the tape 1002 may have at least one uneven surface 1004 facing the drive roller 204g. The pliable material on the surface of the drive roller 204g contacts the uneven surface 1004 of the tape 1002 to mechanically engage the tape 1002. The compression roller 206d is forced toward the tape 1002, which forces the tape 1002 toward the drive roller 204g. The uneven surface 1004 of the tape 1002 protrudes into the pliable surface 902 of the drive roller 204g to mechanically engage the drive roller 204g and the tape 1002. The drive roller 204g is turned, thereby imparting a drive force to the tape 1002 via the mechanical engagement of the uneven surface 1004 of the tape 1002 with the pliable surface 902 of the drive roller 204g. As depicted in FIG. 10, at least a portion of the uneven surface 1004 of the tape 1002 embeds into the pliable layer 902 on the outer surface of the drive roller 204g. As the drive roller rotates in direction R, vector forces V are created by the mechanical engagement of the embedding of the uneven surface 1004 of the tape 1002 into the pliable layer 902 of the drive roller 204g. The vector forces V push the tape 1002 in the direction D based on the rotation R illustrated in FIG. 10. The tape 1002 may be a structural tape. The disclosure provided herein applies to this example having the pliable layer on the surface of the drive roller and the uneven layer on the tape. This structural tape deployment apparatus 100 described with reference to FIGS. 9 and 10 also may use a thinner tape and have reduced volume and weight. In addition to the advantages over conventional drives discussed previously, this example may use an even thinner tape because the tape may not have the pliable layer.

Figure 11A:
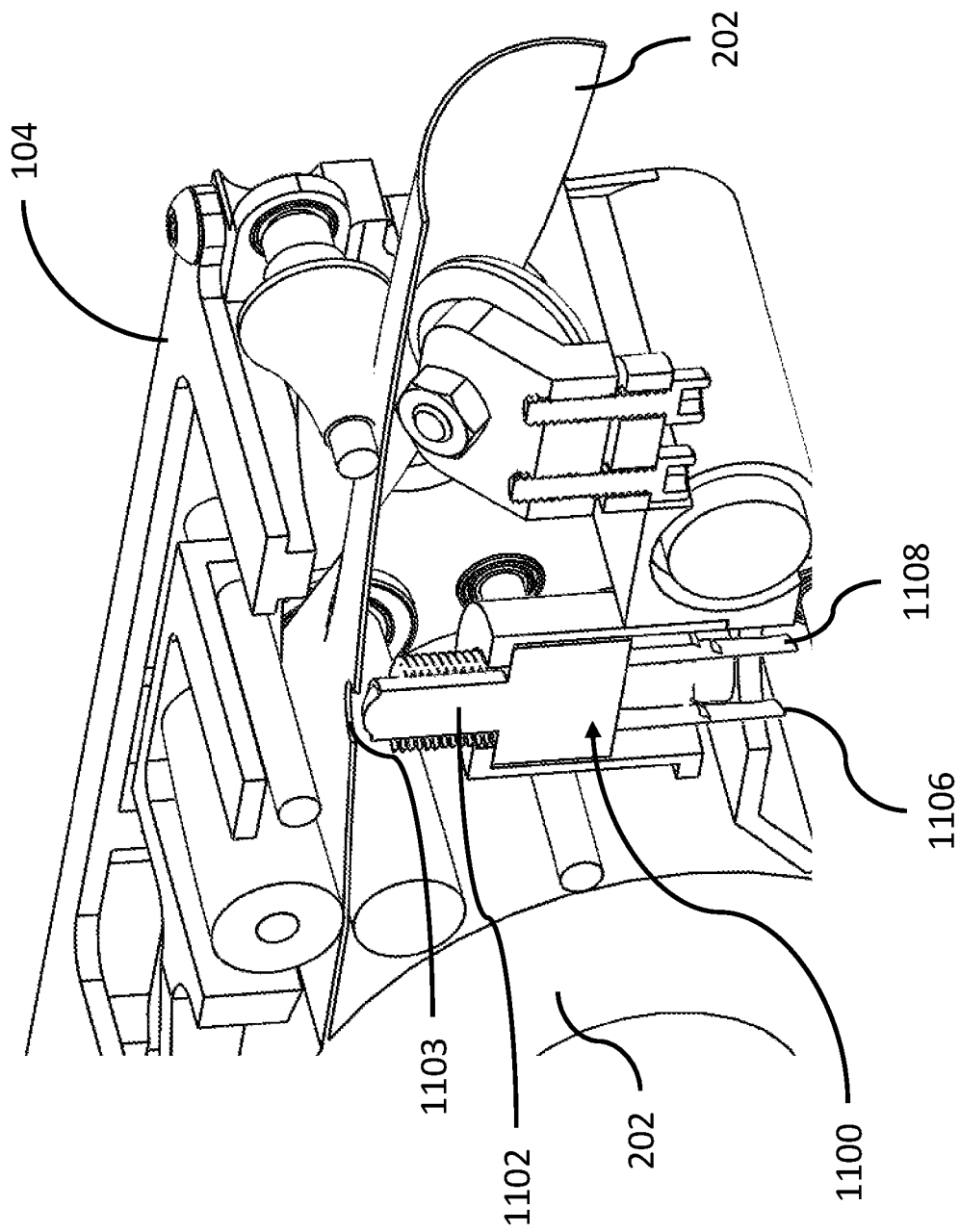
FIG. 11A is a perspective cross-sectional view of a limit switch comprising a plunger that is not engaged with a structural tape of a structural tape deployment apparatus, in accordance with certain examples.
Figure 11B:
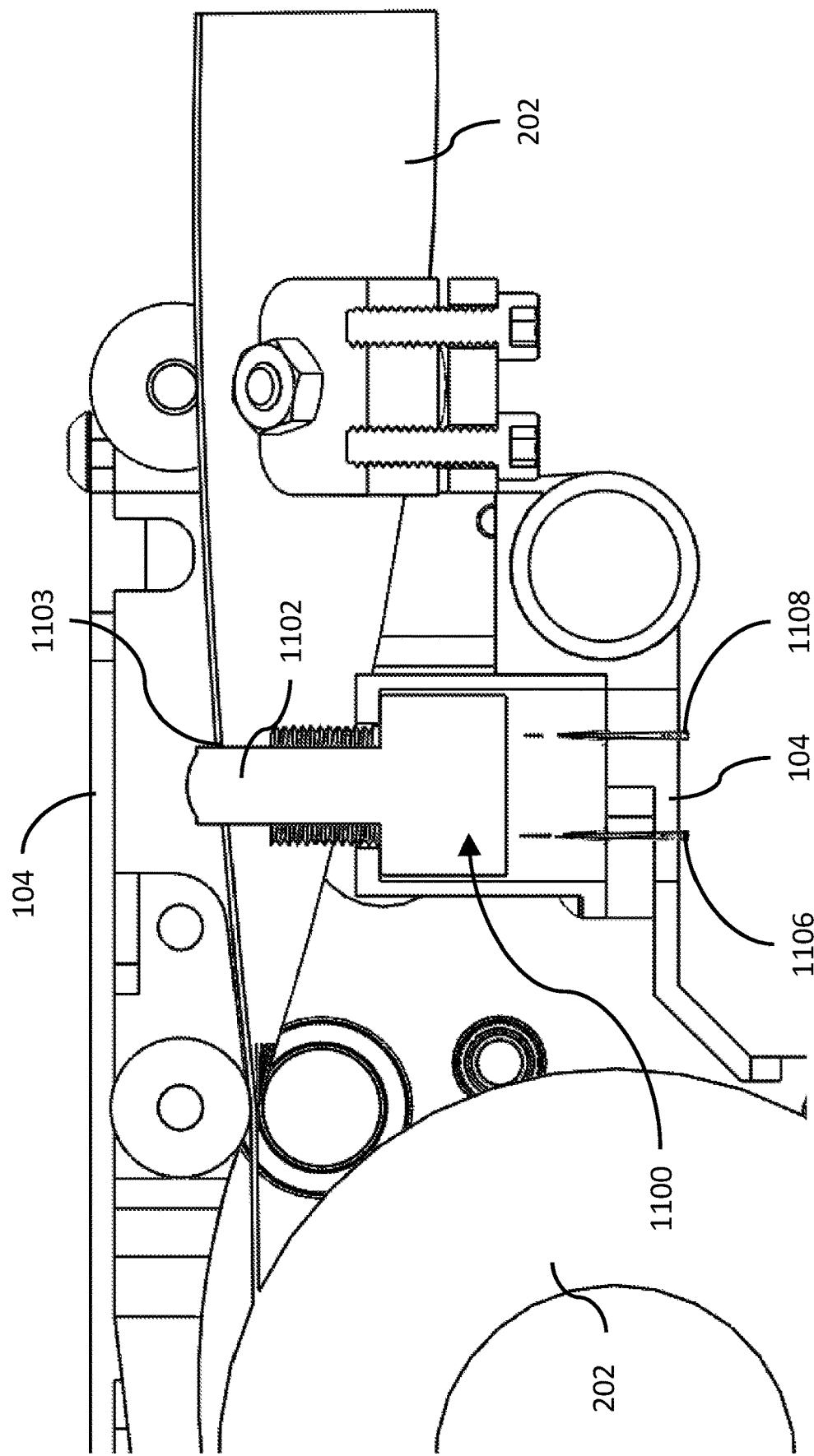
FIG. 11B is a side cross-sectional view of a limit switch comprising a plunger that is engaged with a structural tape of a structural tape deployment apparatus, in accordance with certain examples.

A limit switch 1100 will now be described with reference to FIGS. 11A-11C. FIG. 11A is a perspective cross-sectional view of the limit switch 1100 comprising a plunger 1102 that is not engaged with a tape 202 of a structural tape deployment apparatus 100, in accordance with certain examples. FIG. 11B is a side cross-sectional view of the limit switch 1100 comprising the plunger 1102 that is engaged with a structural tape 202 of a structural tape deployment apparatus 100, in accordance with certain examples. As depicted in FIGS. 11A and 11B, the tape 202 comprises an aperture 1103 therein. The limit switch 1100 comprises a plunger 1102 extending from a limit switch housing 1104. The limit switch 1100 also may comprise one or more power inputs/outputs 1106 and/or control signal inputs/outputs 1108.

As the tape 202 is extended, the plunger 1102 is depressed and rests on an underside of the tape 202 facing the limit switch 1100. A spring force (not depicted in FIGS. 11A and 11B) biases the plunger 1102 away from the limit switch housing 1104 toward the tape 202. When the aperture 1103 of the tape 202 is moved over the plunger 1102 of the limit switch 1100, the spring force extends the plunger 1102 into the aperture 1103 of the tape 202, thereby stopping extension or retraction of the tape 202. Mechanical engagement of the plunger 1102 of the limit switch 1100 with the aperture 1103 of the tape 202 prevents further extension or retraction of the tape 202.

The limit switch 1100 may comprise one or more circuits (not depicted in FIGS. 11A and 11B) to extend/retract the plunger 1102, to report extension (or other position) of the tape 202 and/or the plunger 1102, and/or to stop/start the motor 204a (FIG. 4). For example, extension of the plunger 1102 into the aperture 1103 of the tape 202 can mechanically close a circuit in the limit switch 1100. Closing the circuit in the limit switch can activate a relay in the power circuit to the motor 204a, thereby interrupting power to the motor

204a. Without power, the motor 204a can neither extend nor retract the tape 202. Further operation of the tape 202 and/or the plunger 1102 can then be initiated via further control signals to the tape 202 and the plunger 1102 to retract the plunger 1102 and operate the motor 204a to drive the tape 202.

Closing the circuit in the limit switch 1100 also can initiate a signal to a processor (not illustrated). The processor can interpret the signal to indicate that the tape 202 is in the fully extended state, based on the plunger 1102 engaging with the aperture 1103 of the tape 202. In this case, the aperture 1103 is provided at a location in the tape 202 where the tape 202 is in the fully extended position. The tape may have multiple apertures 1103 at specified positions in the tape 202, and the processor can interpret each signal from the limit switch 1100 to indicate a particular position. For example, the tape 202 may comprise one or more of an aperture 1103 at the fully extended position, an aperture at the fully retracted position, and one or more apertures 1103 at positions between the retracted position and the extended position. If the tape comprises n number of apertures 1103, the processor can interpret a first signal from the limit switch 1100 as corresponding to a first intermediate extension of the tape 202, each signal thereafter from the limit switch 1100 up to the nth signal as corresponding to a respective (previously specified) intermediate extension of the tape 202, and an nth signal from the limit switch 1100 as corresponding to the fully extended position of the tape 202. The processor can output a notification indicating the relative position of the tape 202 based on the signal from the closed circuit in the limit switch 1100. The processor outputs or otherwise communicates the resulting position of the tape 202. For example, the processor may communicate a notification to an internal or external computer system indicating the position of the tape 202. The processor may also activate one or more indicators, such as lights or sounds, that indicate the resulting position of the tape 202.

Closing the circuit in the limit switch may also (or alternatively) provide a direct indication of the full extension of the tape 202. For example, closing the circuit in the limit switch may allow electricity to a visual indicator, such as a light bulb.

The plunger 1102 can be retracted from the aperture 1103 to allow subsequent retraction or extension of the tape 202. For example, the limit switch 1100 may comprise an electromagnetic circuit that, when closed, induces a magnetic force near the plunger 1102, thereby retracting the plunger 1102 in a direction away from the tape 202 and out of the aperture 1103 of the tape 202. In this case, the electromagnetic force overcomes the spring force biasing the plunger 1102 toward the tape 202. When the plunger 1102 is retracted, the circuit to the motor 204g is closed, thereby allowing electricity to the motor 204g for retracting or extending the tape 202. More specifically, opening the circuit in the limit switch can deactivate the relay in the power circuit to the motor 204a, thereby allowing power to the motor 204a. The electromagnetic force may be removed after movement of the aperture 1103 of the tape 202 from alignment with the plunger 1102. Then, the spring force again biases the plunger 1102 toward the tape 202. As the plunger 1102 is restricted from full movement away from the limit switch housing 1104 by the surface of the tape 202, the circuit to the motor 204g remains closed until the plunger 1102 extends fully into the aperture 1103 of the structural tape 202.

Although the limit switch is described herein with reference to the structural tape 202, the limit switch 1100 is suitable for use with any structural tape. For example, the limit switch 1100 may be used with the structural tape 1002 described with reference to FIG. 10 or with any other structural tape.

Figure 12A:
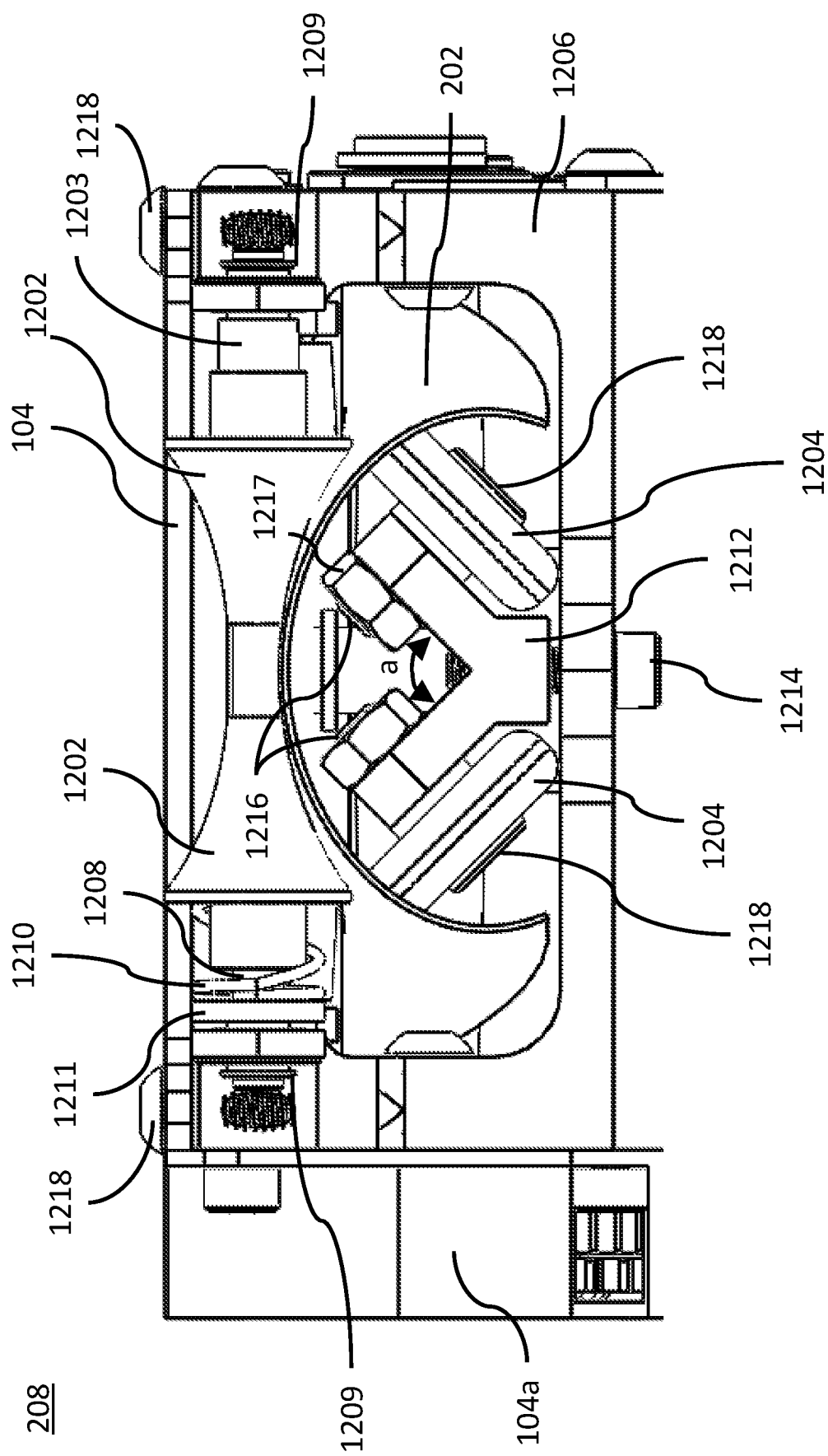
FIG. 12A is a front view of a tape guide assembly of a structural tape deployment apparatus, in accordance with certain examples.
Figure 12B:
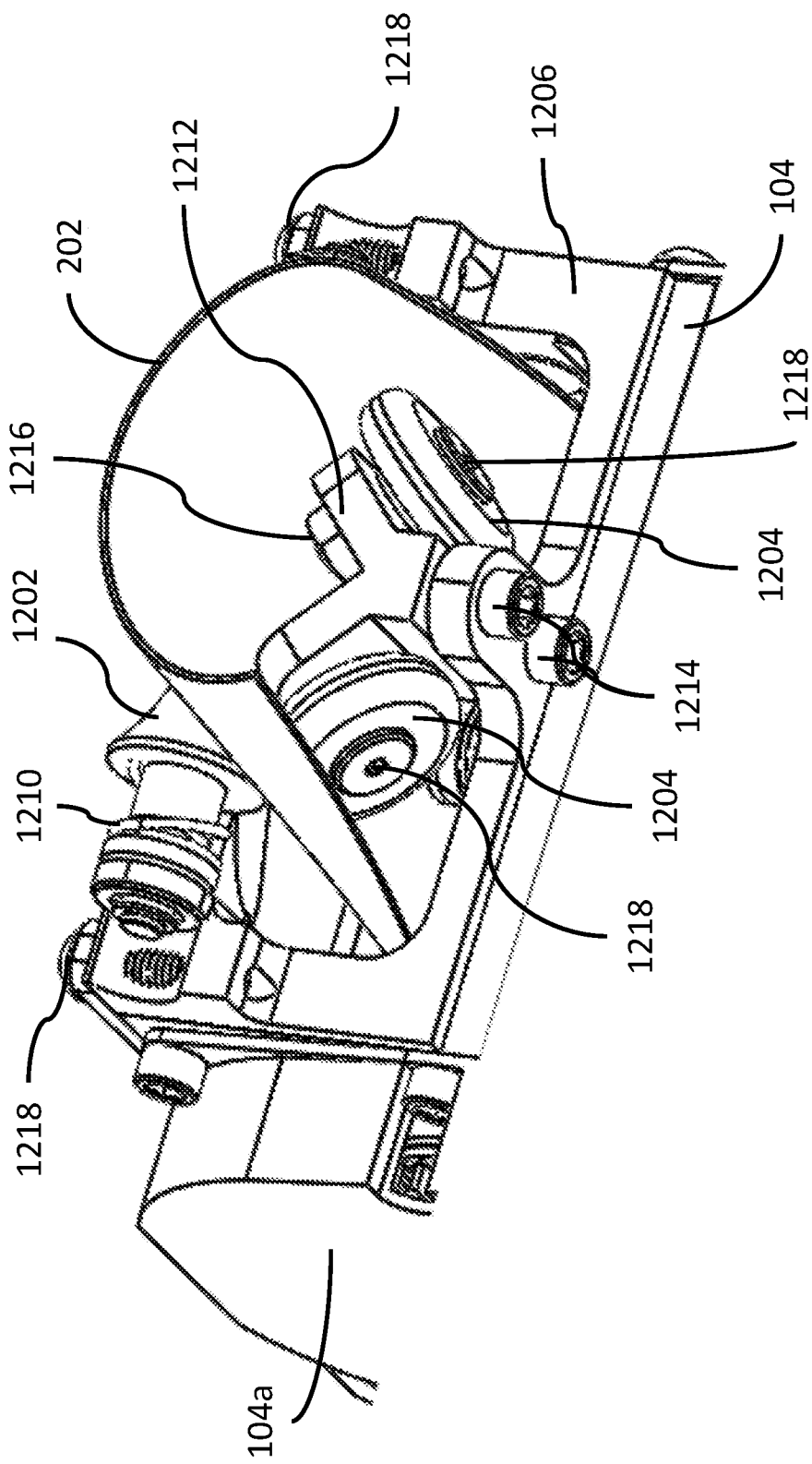
FIG. 12B is a front perspective view of the tape guide assembly of FIG. 12A, in accordance with certain examples.

The tape guide assembly 208 will now be described in further detail. FIG. 12A is a front view of a tape guide assembly 208 of a structural tape deployment apparatus 100, in accordance with certain examples. FIG. 12B is a front perspective view of the tape guide assembly 208 of the structural tape deployment apparatus 100, in accordance with certain examples.

The tape guide assembly 208 supports the tape 202 in the transition from the flat, rolled state to the extended, curved state. As depicted in FIGS. 12A and 12B, the tape guide assembly 208 comprises a pair of guide rollers 1202 and a pair of guide wheels 1204 that support the structural tape 202 in its curved state for extension.

The guide rollers 1202 are mounted on an axel 1208. The guide rollers 1202 have a curved profile matching the curvature of the tape 202. End bushings 1211 also may be placed on the axel 1208 to further align the guide rollers 1202 with the tape 202. The end bushings 1211 may be anti-friction washers disposed on either side of the axel 1208, and one or both bushing 1211 may be collared to keep the spring centered. The axel 1208 may be mounted in a tape guide assembly frame 1206 and held therein by snap rings 1209. A space may exist between the guide rollers 1202 and one or more of the end bushings 1211 to allow lateral movement of the guide rollers 1202 with lateral movement of the tape 202 during extension or retraction of the tape 202. Additionally, the guide rollers 1202 may move apart from each other with lateral movement of the tape 202. A spring 1210 may allow for such movement of the guide rollers 1202 while biasing the guide rollers 1202 toward a centerline position for retraction/extension of the tape 202. A spacer bushing 1203 on the axel 1208 works in conjunction with the spring 1210 to align the curved profile of the guide rollers 1202 with the curvature of the tape 202. A second spring 1210 (not depicted in FIG. 12A) may be used on an opposite side of the guide rollers 1202 instead of the spacer bushing 1203.

The guide wheels 1204 comprise bearings 1218 mounted on axels 1216, which allow the guide wheels to rotate based on movement of the tape 202. The axels 1216 are mounted to a guide wheel frame 1212, which disposes the guide wheels 1204 relative to the tape 202. Fasteners 1217, such as nuts, may secure the axels 1216 to the guide wheel frame 1212. The guide wheel frame 1212 is attached to the tape guide assembly frame 1206 via one or more fasteners 1214. A length of the fastener 1214 can control a vertical position of the guide wheels 1204 relative to the tape 202. A spacer (not illustrated) also can be placed between the guide wheel frame 1212 and the tape guide assembly frame 1206 to control the vertical position of the guide wheels 1204 relative to the tape 202.

The tape guide assembly frame 1206 is attached to the housing 104 by one or more fasteners 1218 to couple the tape guide assembly 208 to the structural tape deployment apparatus 100.

The guide rollers 1202 and the guide wheels 1204 are disposed on opposite sides of the tape 202 to support the tape 202 in the transition from the flat, rolled state to the extended, curved state, or from the extended, curved state to the flat, rolled state. The guide rollers 1202 and the guide wheels 1204 can be sized to accommodate a specified contour of the tape 202. For example, different tapes 202 have different properties, depending on the material composition of the tape, the strength/thickness of the tape, and/or the design for which the tape is developed. These different properties result in different characteristics of the tapes 202, such as larger or smaller diameters of the curvature of the tape 202 and/or the shape of the curvature of the tape 202. The curved profile of the guide rollers 1202 can be chosen to accommodate the curvature of a specific tape 202 used in the structural tape deployment apparatus 100. Guide wheels, such as the guide wheels 1204, also can be used as the guide rollers 1202. In that case, a diameter and separation of the guide wheels is selected to contact the tape 202 at the desired contour/location of the tape 202. Additionally, a number of the guide rollers 1204, a size of the guide rollers 1204, a size of the guide roller frame 1212, and/or an angle "a" separating the guide rollers 1204 on the guide roller frame 1212 can be chosen to accommodate the curvature of a specific tape 202 used in the structural tape deployment apparatus 100. One guide roller 1204 or two or more guide rollers may be used, and the guide roller frame 1212 can be adapted accordingly to accommodate the desired number of guide rollers 1204.

Figure 13A:
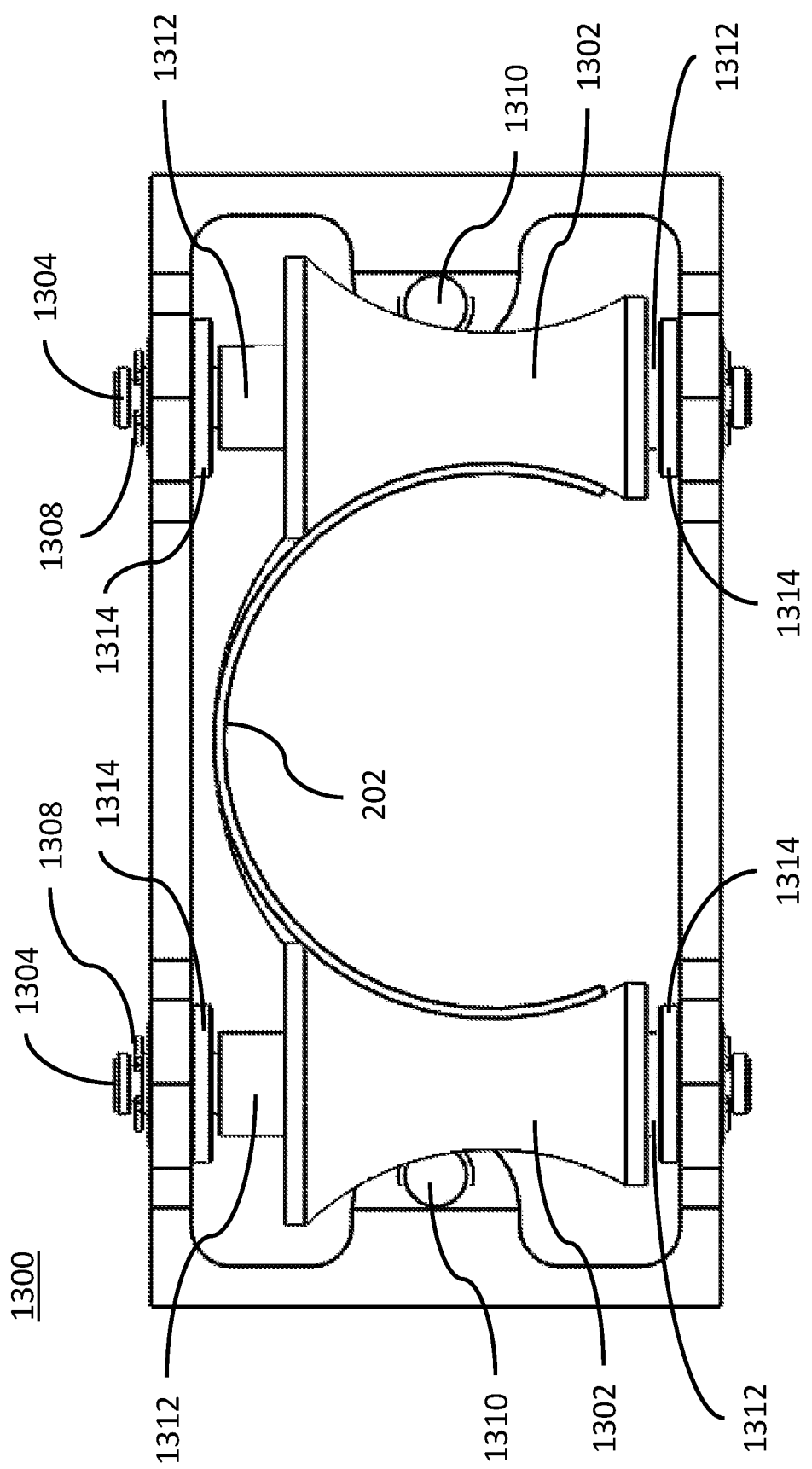
FIG. 13A is a front view of a tape guide assembly of the tape deployment apparatus, in accordance with certain alternative examples.
Figure 13B:
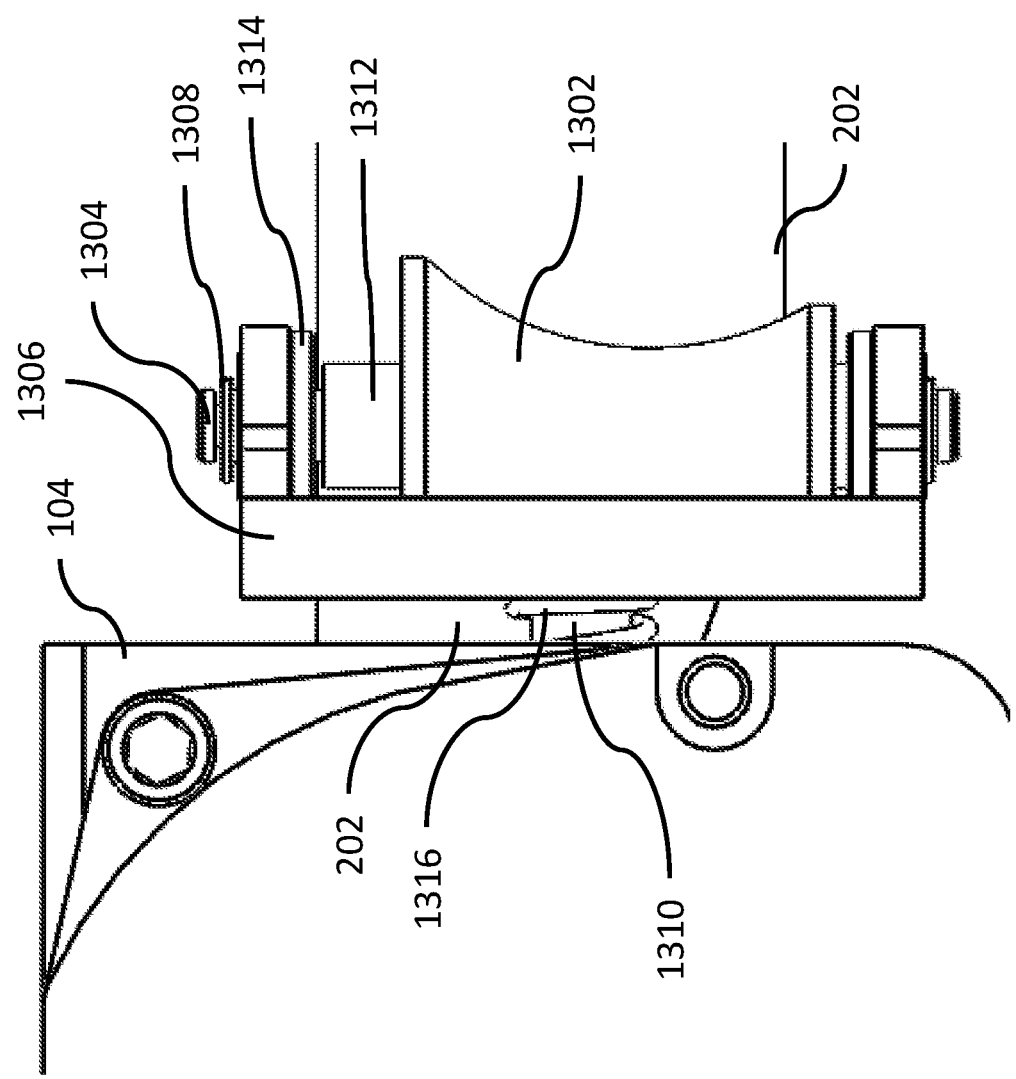
FIG. 13B is a side view of the tape guide assembly of FIG. 13A in a non-extended position, in accordance with certain alternative examples.
Figure 13C:
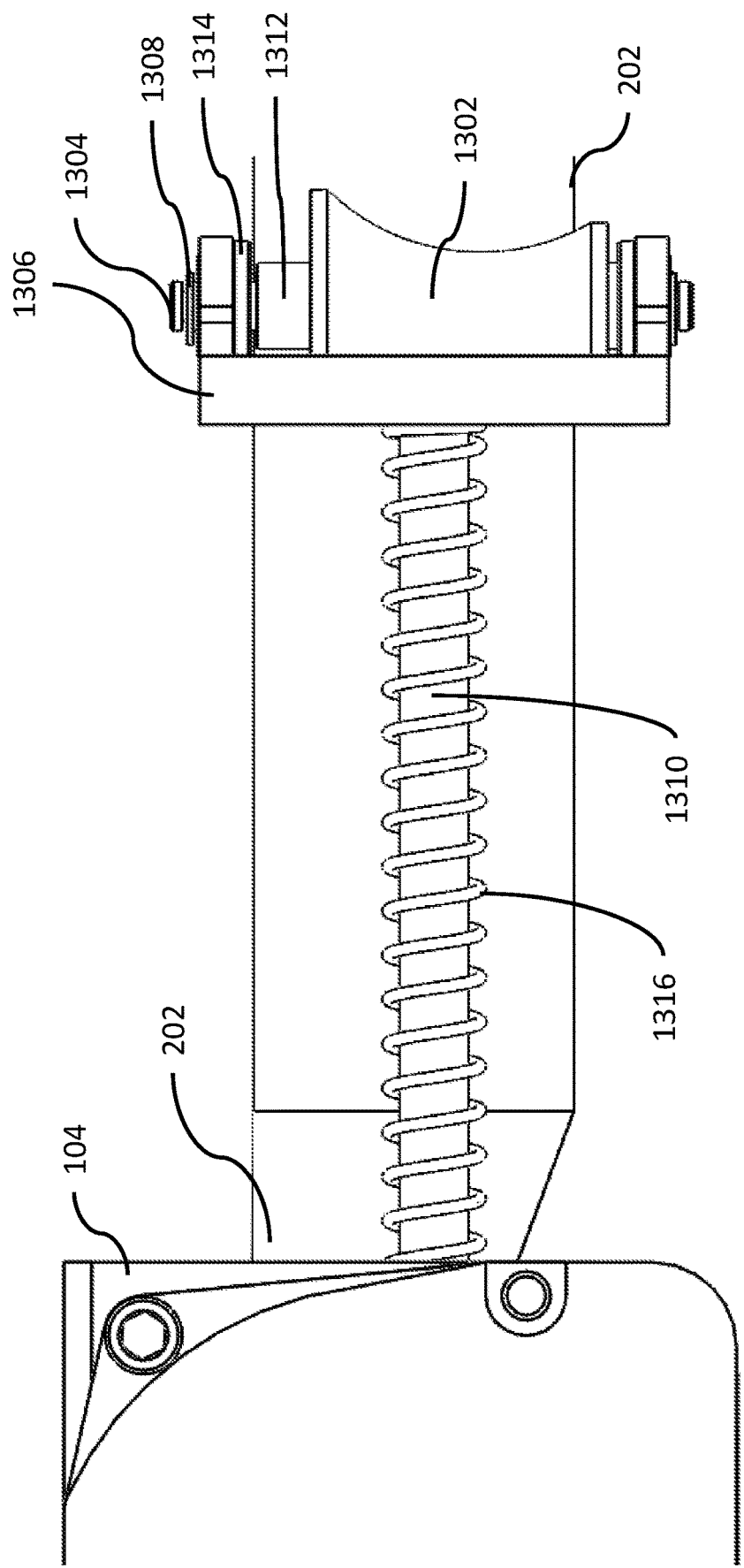
FIG. 13C is a side view of the tape guide assembly of FIG. 13A in an extended position, in accordance with certain alternative examples.

An extendable tape guide assembly 1300 will now be described with reference to FIGS. 13A, 13B, and 13C. FIG. 13A is a front view of a tape guide assembly 1300 of the tape deployment apparatus 100, in accordance with certain alternative examples. FIG. 13B is a side view of the tape guide assembly 1300 of FIG. 13A in a non-extended position, and FIG. 13C is a side view of the tape guide assembly 1300 of FIG. 13A in an extended position.

The tape guide assembly 1300 comprises a pair of guide rollers 1302 disposed on opposite sides of the tape 202 to support the tape 202 in the transition from the flat, rolled state to the extended, curved state, or from the extended, curved state to the flat, rolled state.

The guide rollers 1302 are mounted on axels 1304. The guide rollers 1302 have a curved profile matching the curvature of the tape 202. End bushings 1312 may be placed on the axels 1304 to align the guide rollers 1302 with the tape 202. The axels 1304 may be mounted in a tape guide assembly frame 1306 and held therein by snap rings 1308. Bearings 1314 may also be mounted on the axels 1304 to facilitate rotation of the guide wheels 1302 caused by movement of the tape 202.

The tape guide assembly frame 1306 is attached to the housing 104 by one or more extension rods 1310 to couple the tape guide assembly 1300 to the structural tape deployment apparatus 100. More specifically, the extension rods 1310 are coupled on one end to the tape guide assembly frame 1306 and on another end to the housing 104 of the structural tape deployment apparatus 100.

The ends of the extension rods 1310 can be fixed to the housing 104 to hold the tape guide assembly 1300 in a fixed position on the structural tape deployment apparatus 100. Alternatively, the extension rods 1310 may slide through corresponding apertures in the housing 104 until extended to contact a stop (not depicted in FIG. 13C because it is hidden inside the housing 104) on the ends of the extension rods 1310 extending through the housing 104. The stop may be nuts, C-clips, or other mechanical items on the ends (or other desired location on the extension rods 1310) of the extension rods 1310 that are larger than an opening in the housing 104 through which the extension rods 1310 are disposed. Springs 1316 disposed around the extension rods 1310 bias the tape guide assembly frame 1306 away from the housing 104 to extend the tape guide assembly 1300 away from the housing 104. In this manner, the tape guide assembly may be stowed in the compressed (or "retracted") position closer to the housing 104 for transport and then deployed away from the housing 104 for operation. This configuration provides a smaller volume during transport/launch of the structural tape deployment apparatus, while also providing the tape guide assembly 1300 at a desired position during operation for the transition of the tape from the flat, rolled state to the curved, extended state. A length of the extension rods is selected to provide the desired positioning of the tape guide assembly 1300 for a particular tape 202, depending on the particular characteristics (e.g., stiffness, transition point, and/or curvature) of the tape 202.

The extendable tape guide assembly 1300 is not limited to the configuration depicted in FIGS. 13A-13C. For example, the tape guide assembly 208 described with reference to FIGS. 12A-12B can be mounted to the housing 104 using the extendable design described with reference to FIGS. 13A-13C.

Figure 14:
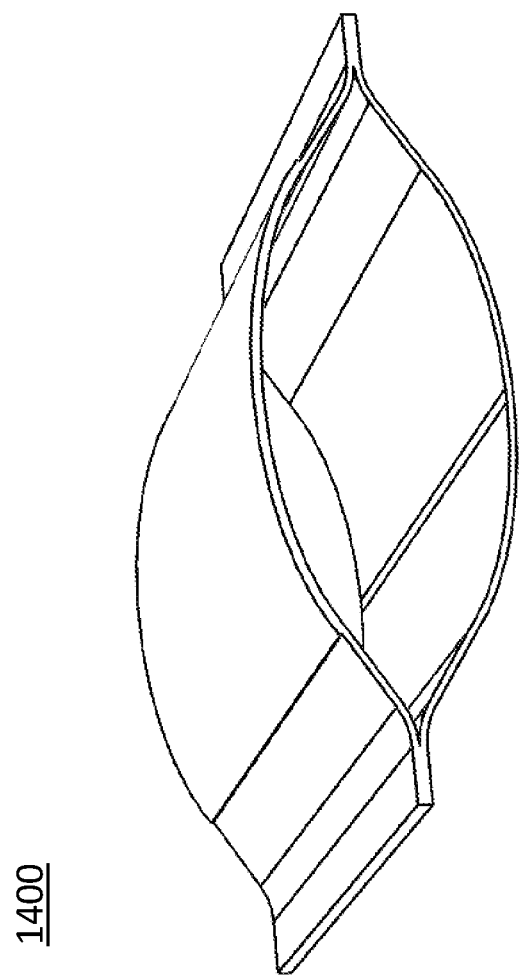
FIG. 14 is a perspective view of a lenticular structural tape, in accordance with certain examples.

FIG. 14 is a perspective view of a lenticular tape 1400. A lenticular tape 1400 may be used in the structural tape deployment apparatus described herein, with a pliable layer 504 provided on at least one surface of the lenticular tape 1400. The lenticular tape 1400 expands from a flat, compressed state in the rolled position to the lenticular shape in the extended position (shown in FIG. 14).

The structural tape deployment apparatus 100 described herein is useful for mechanically driving a tape 202 between rolled and extended positions A, B (FIG. 2). The structural tape deployment apparatus 100 is particularly useful in space applications where a design may not rely solely on friction between the drive roller and the tape to drive the tape. The mechanical engagement of the drive roller 204g with the surface of the tape 202 as described herein provides a driving force other than and/or in addition to friction to drive the tape 202 between the rolled and extended positions A, B (FIG. 2).

The structural tape deployment apparatus 100 described herein may use less power and have a smaller volume and weight compared to conventional drives. The drive mechanism described herein does not include long protrusions that extend through the tape. Accordingly, the drive roller 204g described herein has a smaller diameter than conventional systems and therefore requires less power to drive. A smaller motor 204a with less torque is sufficient to drive the drive roller 204g while still providing sufficient force to drive the tape 202 between the rolled and extended positions A, B. The smaller diameter drive roller 204g and smaller motor 204a result in a smaller overall volume and weight of the apparatus.

The structural tape deployment apparatus 100 described herein also may use a thinner tape than conventional drives. Conventional drives have many holes drilled in the length of the tape to allow protrusions from the drive roller to extend into the holes to drive the tape as the drive roller turns. However, these holes make the tape structurally weaker, thereby requiring a thicker tape to achieve the same strength that a tape without holes would provide. The structural tape deployment apparatus 100 described herein can reduce or eliminate the need for holes drilled in the length of the tape. The uneven surface 602 of the drive roller 204g is pressed into the pliable layer 504 of the tape to mechanically engage the surface of the tape, thereby mechanically driving the tape as the drive roller 204g turns. Without holes in the length of the tape, a thinner tape may be used while maintaining a desired strength of the tape. This thinner tape also may result in reduced weight and volume of the structural tape deployment apparatus 100.

In a method to deploy a structural tape from a rolled state to an extended state, a structural tape is positioned between a compression roller and a drive roller. The tape comprises a pliable surface contacting an uneven surface of the drive roller. The compression roller is forced toward the tape, which forces the tape toward the drive roller. The uneven surface of the drive roller protrudes into the pliable surface of the tape to mechanically engage the tape. The drive roller is turned, thereby imparting a drive force to the tape via the mechanical engagement of the uneven surface of the drive roller with the pliable surface of the tape. The drive force is tangential to the drive roller at the point of contact with the tape.

A structural tape comprises a rigid layer and a pliable layer disposed on the rigid layer. The tape is bi-stable, such that the tape is stable is both a rolled state and an extended state. In the extended state, the tape is straight and rigid and may comprise a curved profile.

A drive roller comprises a pliable layer disposed on a surface of the drive roller. The pliable surface of the drive roller engages an uneven surface of a tape to drive the tape between rolled and extended positions.

Embodiments may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing embodiments in computer programming, and the embodiments should not be construed as limited to any one set of computer program instructions. Further, an ordinarily skilled programmer would be able to write such a computer program to implement an embodiment of the disclosed embodiments based on the drawings and description provided herein. Therefore, disclosure of a particular set of program code instructions is not considered necessary for an adequate understanding of how to make and use embodiments. Further, those skilled in the art will appreciate that one or more aspects of embodiments described herein may be performed by hardware, software, or a combination thereof, as may be embodied in one or more computing systems. Moreover, any reference to an act being performed by a computer should not be construed as being performed by a single computer as more than one computer may perform the act.

The example embodiments described herein can be used with computer hardware and software that perform the methods and processing functions described herein. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

The example systems, methods, and components described in the embodiments presented previously are illustrative, and, in alternative embodiments, certain components can be combined in a different order, omitted entirely, and/or combined between different example embodiments, and/or certain additional components can be added, without departing from the scope and spirit of various embodiments. Accordingly, such alternative embodiments are included in the scope of the following claims, which are to be accorded the broadest interpretation so as to encompass such alternate embodiments.

Although specific embodiments have been described above in detail, the description is merely for purposes of illustration. It should be appreciated, therefore, that many aspects described above are not intended as required or essential elements unless explicitly stated otherwise. Modifications of, and equivalent components or acts corresponding to, the disclosed aspects of the example embodiments, in addition to those described above, can be made by a person of ordinary skill in the art, having the benefit of the present disclosure, without departing from the spirit and scope of the invention defined in the following claims, the scope of which is to be accorded the broadest interpretation so as to encompass such modifications and equivalent structures.

What is claimed is:

1. A structural tape deployment apparatus, comprising
   a structural tape comprising an aperture therein and comprising an uneven surface layer;
   a drive roller comprising a pliable surface layer mechanically engaged by the uneven surface layer of the tape to mechanically drive the tape between rolled and extended positions as the drive roller turns; and
   a limit switch that extends from a first position not engaging the aperture in the tape to a second position that engages the aperture in the tape to fix the tape in a specified position.

2. The structural tape deployment apparatus of claim 1, further comprising a compression roller that forces the tape toward the drive roller to mechanically engage the pliable surface layer of the drive roller with the uneven surface layer of the tape.

3. The structural tape deployment apparatus of claim 2, further comprising at least one spring that biases the compression roller toward the drive roller to force the tape toward the drive roller to mechanically engage the pliable surface layer of the drive roller with the uneven surface layer of the tape.

4. The structural tape deployment apparatus of claim 1, further comprising a motor that turns the drive roller.

5. The structural tape deployment apparatus of claim 4, further comprising a series of gears that couple the motor to the drive roller such that a turning force produced by the motor is transferred to the drive roller to turn the drive roller.

6. The structural tape deployment apparatus of claim 1, wherein the pliable surface layer of the drive roller comprises an elastomer.

7. The structural tape deployment apparatus of claim 1, wherein the tape comprises a rigid material, and wherein the uneven surface layer of the tape is disposed on at least a portion of at least one surface of the rigid layer of the tape.

8. The structural tape deployment apparatus of claim 1, wherein the pliable surface layer of the drive roller is not continuous across a surface of the drive roller engaged by the uneven surface of the tape.

9. The structural tape deployment apparatus of claim 1, wherein the pliable surface layer comprises a material having a Shore A rating of between 25 and 75.

10. The structural tape deployment apparatus of claim 9, wherein the pliable surface layer comprises a material having a Shore A rating of about 50.

11. The structural tape deployment apparatus of claim 1, wherein the uneven surface of the tape comprises a knurled surface on the tape.

12. The structural tape deployment apparatus of claim 1, wherein the uneven surface of the tape comprises a particulate bonded to the tape.

13. The structural tape deployment apparatus of claim 1, wherein the pliable surface layer comprises a plurality of strips of a pliable material applied to a surface of the drive roller.

14. The structural tape deployment apparatus of claim 1, further comprising one or more guides that support the tape as the tape is mechanically driven between rolled and extended positions.

15. The structural tape deployment apparatus of claim 1, wherein the limit switch comprises a plunger that is biased towards the tape, the bias of the plunger extending the plunger into the aperture in the tape.

16. The structural tape deployment apparatus of claim 1, wherein the structural tape is stored in a flat state in the rolled position and transitions to a different state in the extended position.

17. The structural tape deployment apparatus of claim 1, wherein the structural tape is a lenticular tape.

\* \* \* \* \*